(12) United States Patent
Moser et al.

(10) Patent No.: US 6,675,907 B2
(45) Date of Patent: Jan. 13, 2004

(54) FLEXIBLE TOOLBAR AND OPERATING HYDRAULIC CIRCUIT

(75) Inventors: Mark K. Moser, St. Joseph, MO (US); Daryl T. Johnson, Newton, IA (US)

(73) Assignee: Case, LLC, Racine, WI (US)

( * ) Notice: Subject to any disclaimer, the term of this patent is extended or adjusted under 35 U.S.C. 154(b) by 0 days.

(21) Appl. No.: 09/922,136

(22) Filed: Aug. 3, 2001

(65) Prior Publication Data

US 2002/0017389 A1 Feb. 14, 2002

Related U.S. Application Data

(60) Provisional application No. 60/224,293, filed on Aug. 10, 2000.

(51) Int. Cl.⁷ .............................................. A01B 63/00
(52) U.S. Cl. ........................ 172/311; 172/456; 172/459; 172/463; 111/121
(58) Field of Search ........................... 172/2, 310, 311, 172/452, 459, 463, 464, 465, 776, 196, 219, 456, 286, 724, 740, 720, 287; 701/50; 92/61, 62, 75; 91/468, 446, 451, 452; 111/59, 121, 62, 22, 25

(56) References Cited

U.S. PATENT DOCUMENTS

| | | | |
|---|---|---|---|
| 3,736,988 A | 6/1973 | Cantral et al. ................ 172/7 |
| 4,042,044 A | 8/1977 | Honnold ..................... 172/311 |
| 4,415,043 A | 11/1983 | Hadler et al. ................ 172/776 |
| 4,422,511 A | 12/1983 | Poggemiller et al. ..... 172/260.5 |
| 4,502,545 A | 3/1985 | Couser ........................ 172/311 |
| 4,700,784 A | 10/1987 | Wiebe et al. ................ 172/126 |
| 5,524,712 A | * 6/1996 | Balmer ........................ 172/311 |
| 5,562,165 A | 10/1996 | Janelle et al. .................. 172/4 |
| 5,641,026 A | * 6/1997 | Balmer ........................ 172/452 |
| 5,653,292 A | 8/1997 | Ptacek et al. ................... 172/4 |
| 5,740,870 A | 4/1998 | Rodgers et al. ............. 172/456 |
| 5,954,139 A | 9/1999 | Forsyth ................... 172/260.5 |
| 6,318,477 B1 | * 11/2001 | Bettin ......................... 172/452 |

* cited by examiner

Primary Examiner—Christopher J. Novosad
(74) Attorney, Agent, or Firm—Rebecca Henkel

(57) ABSTRACT

A winged implement includes an hydraulic control circuit having two operator-controlled valves, including a work valve and a transport valve. Using only these controls, and without leaving the tractor cab, the operator can (1) fold the implement for transport; (2) unfold the wings; (3) place the implement in the field use position with substantial constant down pressure on the wings; and (4) raise the wings and center section to an intermediate position with the wings inclined upwardly for end row turns.

19 Claims, 15 Drawing Sheets

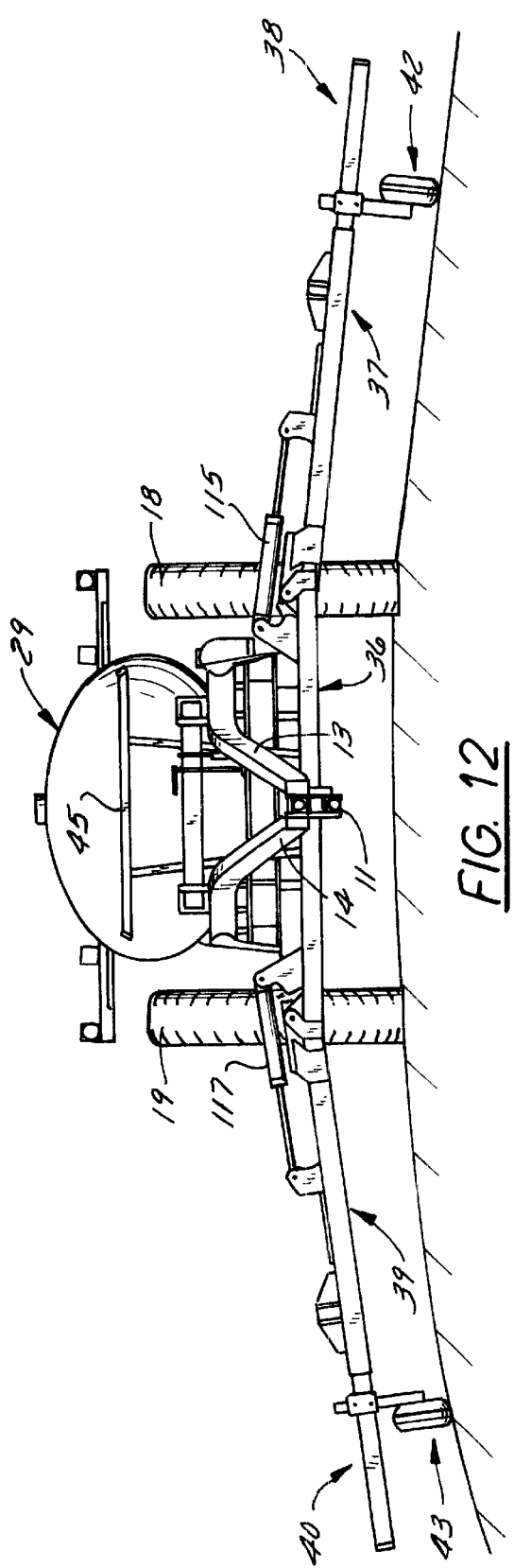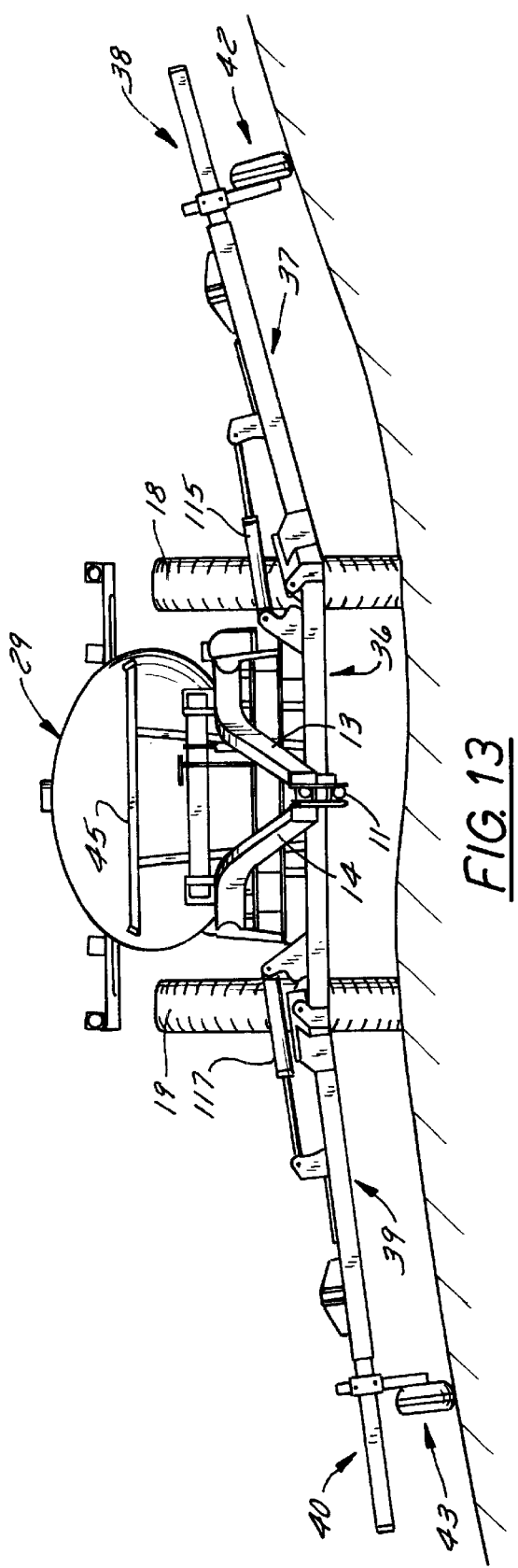

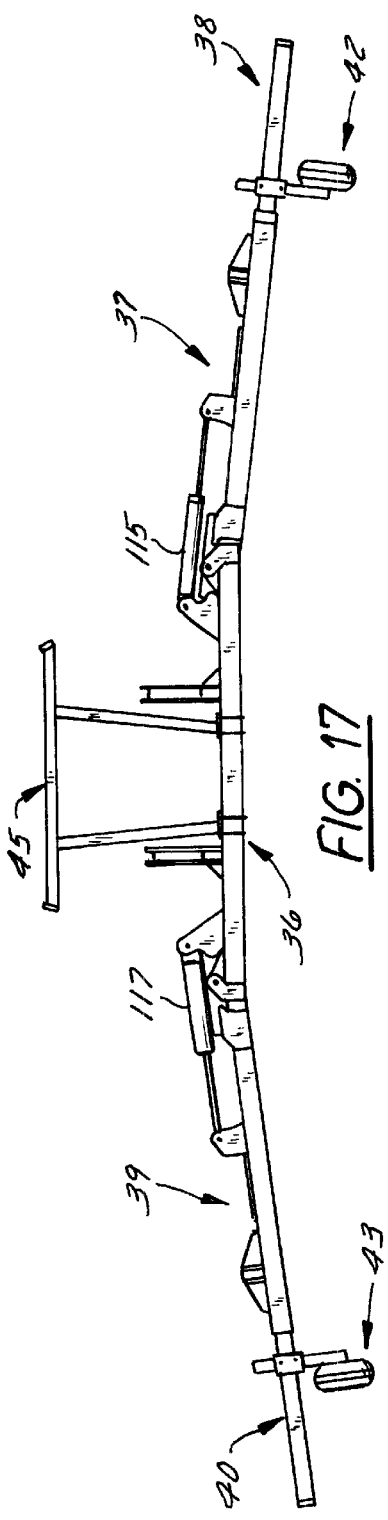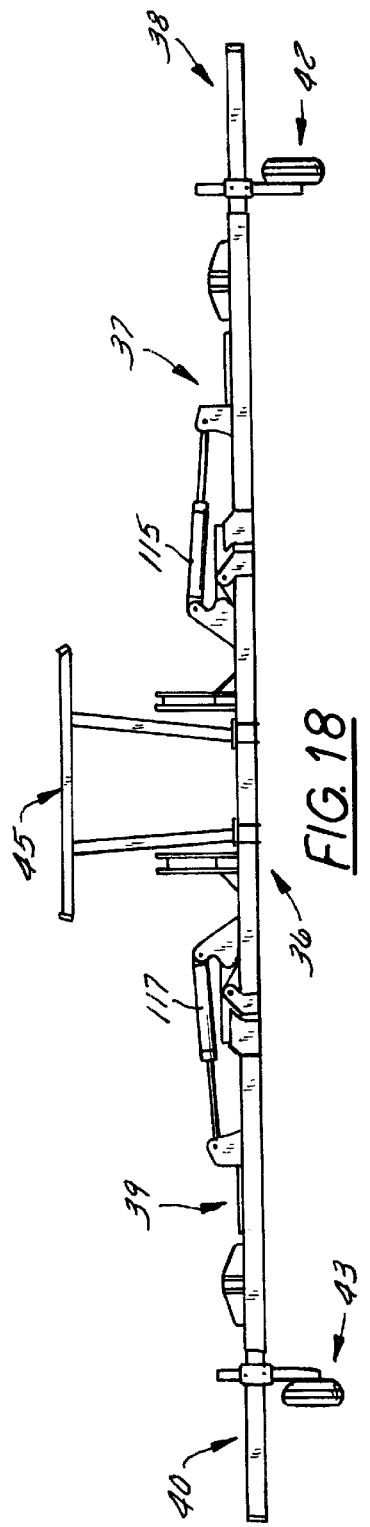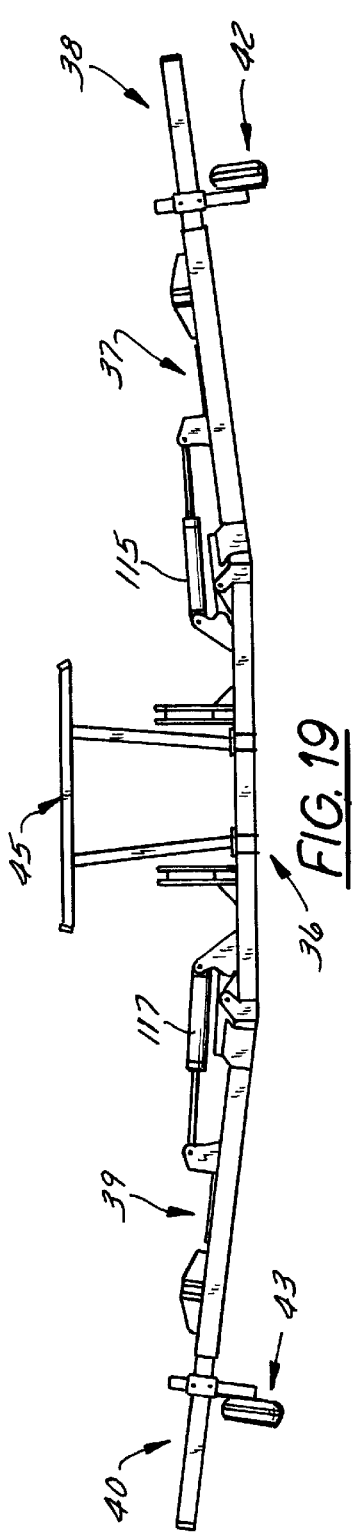

FLEXIBLE TOOLBAR AND OPERATING HYDRAULIC CIRCUIT

RELATED APPLICATIONS

This is a Non-Provisional Application of co-pending, co-owned provisional application No. 60/224,293, for "Flexible Toolbar and Operating Hydraulic Circuit", filed Aug. 10, 2000.

FIELD OF THE INVENTION

The present invention relates to agricultural toolbars, and more particularly, it relates to agricultural toolbars which are flexible, permitting outboard wings to independently adjust vertically to follow variations in ground contour. The present invention is described in the context of an applicator for liquid fertilizer, although the structure and hydraulic operating circuit for the disclosed toolbar has broader application than liquid fertilizer applicators.

BACKGROUND OF THE INVENTION

Agricultural toolbars, particularly toolbars which are designed to apply liquid fertilizer, are typically designed so that the mounting bars on which the individual applicator units are fixed, are held or supported at a desired distance above the ground by adjustable depth gauging wheels. This is because it is highly desirable that fertilizer be placed at a constant depth beneath the surface of the soil so that the fertilizer is available to the plant for the various stages of development and growth of the plant.

Up to a width of ten feet or so, rigid toolbars are useful because the variations in ground contour over a ten-foot span transverse of the direction of travel of the tractor, typically would not encounter a substantial variation such as might result in non-uniform application of liquid fertilizer. For greater widths, however, agricultural toolbars are typically supported with their own gauge wheels, and they include a center section and right and left wings which are hinged to the center section so that each wing may independently follow the contour of the ground. Toolbars which have wings capable of hinging about horizontal axes extending parallel to the direction of travel are called "flexible" toolbars. The term refers to the independent vertical movement or flexing of the wings relative to the center section. Even wider toolbars, such as the one in connection with which the present invention is illustrated, may have each wing divided into an inner wing section and an outer wing section which fold or hinge relative to each other about a vertical axis (in the field use position) which reduces the overall height of the implement during transport and provides even more compact, and thus more maneuverable arrangement for road travel. It is desirable that a section of the toolbar have a width no greater than eighteen feet in order to accommodate variations in ground contour most commonly encountered.

Modern farming practices have made it desirable to use large toolbars (that is, toolbars having a greater width in the field use position) because of the increase in the size of farms as well as a desire to reduce operating expense and the amount of time spent in the field. Modern farming practices also make it desirable that a toolbar for applying liquid fertilizer be highly adaptable or adjustable in the sense that it accommodate placement of individual applicators at a wide range of spacings. The applicator units on a fertilizer applicator are normally spaced at a constant distance relative to one another. However, the distance between adjacent applicator units will vary according to farming practices and according to the spacing of crop rows. Planting and fertilizer practices create a demand that a toolbar for liquid fertilizer application be capable of mounting the ground-engaging tools (i.e., applicator units) at a wide range of lateral spacing. The row spacings of particular interest are twenty, twenty-two, thirty, thirty-six, thirty-eight and forty inches. In addition, the present toolbar is capable of supporting a side-dress application for a thirty-inch row spacing with fertilizer placement at six inches on either side of the center of a row.

Moreover, in the past, toolbars for applying liquid fertilizer have been operated with a wide variety of controls and set-up structures, including manual, electrical and hydraulic. The operator is required not only to learn the control system for a particular implement, but he is also required in many situations not only to operate the control system for the toolbar, but also to maneuver the tractor and observe the correct spacing relative to existing crops or to fertilizer which already has been applied in adjacent swaths. It has therefore become desirable that the control system for liquid fertilizer applicators be simplified from the standpoint of operation, particularly during field use and maneuvers. Further, it is desired to avoid manual operations and procedures by the farmer/operator outside of the tractor cab, either in preparing the applicator for transport or in field use. When all operations can be accomplished from the operator's position on the tractor, simplicity and safety are both enhanced.

SUMMARY OF THE PRESENT INVENTION

The illustrated toolbar has a center section and left and right wings. Each wing, in turn, has an inner wing section and an outer wing section. The inner wing sections pivot vertically about respective horizontal axes located at the outboard ends of the center section. The outer wing sections pivot horizontally relative to their associated inner wing sections about axes located at the outboard end of the associated inner wing section. These hinge axes are vertical when the toolbar is located in the field use position. Obviously, the hinge axes of the outer wing sections take various orientations relative to the vertical and the horizontal as the inner wing sections rotate relative to the horizontal.

More recently, larger fertilizer applicators of this type having hinged wings typically include a gauge wheel mounted to the outboard end of each wing. Liquid fertilizer applicator units conventionally include a leading rippled coulter for parting the soil and forming a narrow furrow, followed by an applicator assembly including a is delivery tube for delivering the liquid fertilizer in the furrow. A thin knife may be mounted behind the coulter if desired. The operating depth of the coulter is thus determined by the height of the toolbar to which it is affixed. For the center section, the operating depth is determined by the height of the toolbar of the center section which is adjusted relative to the primary support wheels for the main frame of the unit. The operating depth of the applicator units fixed to the wings is determined by the height of the center section (since the inboard end of each wing is mounted to the center section frame) and the height of the associated wing depth gauge wheel.

The center section and inner wing sections each are formed into double-rank toolbars. By this, it is meant that each frame section has a forward mounting bar and a rear mounting bar. Forward and rear mounting bars in a double-rank toolbar are typically made into a rigid frame by intermediate frame sections extending in the direction of travel. Such an arrangement interferes with the desired universal adjustability in mounting the fertilizer applicator units (i.e., tools) with a wide variety of lateral settings. The structure of the present toolbar does accommodate a wide variety of lateral settings of the tools, including those spacings of greater interest to the farmer/operator. Instrumental in achieving universal adjustability of lateral spacing of applicator units is an unique hinge structure located between the center section and each associated inner wing section. This hinge, while providing a hinge structure for both the forward mounting bars and the rear mounting bars of the inner wing sections, offsets the hinge mounting structure relative to the associated mounting bars in such a manner that for virtually every lateral position in the region of the hinge, either the forward bar or rear mounting bar will accommodate the mounting of an applicator unit. In the past, the use of conventional hinges has made it impossible or impractical to mount the applicator units to the toolbar frame with universal adjustability of spacing yet maintaining uniform spacing between adjacent tools.

The present invention also provides for the application of load or ballast (i.e., a downward force) to the wings during operation by, in effect, transferring weight from the center section (which carries the substantial weight of the mainframe supporting the liquid fertilizer and storage tank) to the wings through the use of a constant pressure hydraulic circuit. The hydraulic circuit is engaged when the fertilizer applicator is in the field use position, and induces a constant downward force on each wing, independent of the downward force on the other wing and independent of the weight being borne by the center section. The downward force applied to each wing is also independent of the positions of the wings with respect to one another and with respect to the center section. That is, the hydraulic circuit is designed so that if one wing flexes downwardly from the horizontal, the constant pressure (and downward force) is maintained, and if the wing flexes upwardly from the horizontal, the constant pressure (and downward force) is also maintained on both wings.

A constant downward force on the wings is desirable because the weight of the wings themselves is not great enough to maintain the applicators in the desired depth setting across the entire width of the toolbar under all soil conditions. For one thing, although the wings are designed to have sufficient strength, including a margin of safety, for all conditions encountered in use, the wings are nevertheless folded upwardly for transport so that excess weight or ballast on the wings is undesirable in the transport configuration. In conditions of dry or packed soil, the resistance to penetration of the coulter typically found on a liquid fertilizer applicator unit, may not penetrate to the desired depth. In this condition, the wing will raise; that is, the gauge wheel on the wing will rise above the ground because a substantial portion of the weight will be borne by the coulters. When a coulter is operating at a depth less than the desired depth, the delivery tube which deposits liquid fertilizer behind the coulter, is raised above the desired depth so that the fertilizer is not deposited at the intended depth.

Thus, according to the present invention, the hydraulic cylinders which raise and lower the inner wings (called "inner wing fold cylinders") are operated under constant hydraulic pressure when the toolbars are placed in a field work position and then forced down for fertilizer application. This permits each wing section to continue to adjust to ground contour independently of the other wing section and the center section, while applying a substantially constant downward force on each wing section so that the coulters will penetrate even compacted, hard soil, and the applicator units will operate to deliver the liquid fertilizer consistently to the desired depth.

The hydraulic control circuit for the present invention operates in four primary is modes or cycles: (1) Unfold, (2) Work or Field Use, (3) End of Row Turn, and (4) Fold. All functions are accomplished by the operation of two main valves, a work valve and a transport valve, both located in the tractor cab for convenience and safe access. Assuming that the toolbar is in a horizontal position, having undergone an Unfold cycle from the transport position, the operator places the work hydraulic valve in a detent position. This position causes a main or center lift cylinder to retract, lowering the center frame section to operating (i.e., work or field use) position. The wings are then forced downwardly because the inner wing fold cylinders are extended. When the inner wing fold cylinders are fully extended, they are placed in a constant hydraulic pressure operating mode. That is, hydraulic pressure and flow from the tractor hydraulic pump is fed through a reducing/relieving valve and coupled to the inner wing fold cylinders to place them in the extended position with a constant hydraulic pressure in the butt or cylinder end. This applies a constant downward force on the wings, transferring weight from the center frame section to the wings, while permitting the wings independently to accommodate variations in the terrain. The constant downward force on the wings permits the applicator tools to operate at the desired depth, set by the wing gauge wheels, as the implement is drawn forward by the tractor. Operation in the Work mode may continue as the operator desires since the lever operating the directional Work valve is in a stable, detented position.

At the end of a row, the operator places the Work valve in an End of Row Turn mode. In this mode, the main lift cylinder is extended to raise the center section frame, and the inner wing fold cylinders are retracted a limited amount, disengaging all ground tools and raising them to the End of Row Turn position. A limit switch is actuated as the wings are placed in a position which is substantially horizontal, but turned up slightly. Thus, the fertilizer applicator tools are raised from the soil, permitting the operator to effect an End of Row turn.

After the operator has completed the desired fertilizer application, and he wishes to move the implement to another location, the implement is placed in a transport configuration. To achieve this, the operator actuates the directional Transport valve to the Fold position. The hydraulic system causes the main lift cylinder to extend, raising the center section frame. In addition, the hydraulic system causes the outer wing fold cylinders to retract, folding the outer wing sections rearwardly about vertical axes. That is, the toolbars of the outer wing sections remain in the same general plane as the toolbars of the adjacent inner wing section. The inner wing sections are then folded over center by retraction of the inner wing fold cylinders until the wings rest on a wing support mounted to the center section frame. When the wings come to rest on the wing support, the inner wing sections extend inwardly, forming a delta shape with the center section frame; and the outer wing sections extend generally horizontally in a rearward direction. This reduces the overall height of the implement in the transport mode, and enhances the safety of the implement.

To place the implement from the transport position to the unfold position, the operator places the Transport valve in a second or unfold position. When the Transport valve is placed in the unfold position, the inner wing fold cylinders extend. The wings rotate outwardly relative to their associated hinge connections to the center section frame, so that the inner wing sections rotate downwardly. The inner wing sections achieve the desired horizontal position and actuate the limit switch to stop the unfolding of the inner wing sections. The outer wing sections are then rotated to extend outwardly, aligning with their associated inner wing sections. This unfold sequence reduces the overall height of the implement and reduces the possibility of interference from obstacles during the Unfold cycle.

Thus, the entire operation of the implement is controlled from the operator's position on the tractor using two tractor hydraulic selective control valves. This allows the operator to concentrate on tractor placement, tractor speed and row alignment, rather than manual procedures or distracting operations for the implement, while providing a winged fertilizer applicator implement having both inner wing sections and outer wing sections for increased operational width while reducing the overall transport height to manageable dimensions.

Other features and advantages of the present invention will be apparent to persons skilled in the art of the following detailed description of a preferred embodiment accompanied by the attached drawing, wherein identical reference numerals refer to like parts in the various views.

BRIEF DESCRIPTION OF THE DRAWINGS

FIG. 12 is a view similar to FIG. 10 with the center section on level ground and both wing sections on lower ground;

FIG. 13 is a view of the implement similar to FIG. 10 with the left wing section elevated, the center section on level ground, and the right wing on lower ground;

FIGS. 17–19 are front elevational views of the complete toolbar of the implement of FIG. 1 showing, respectively, the outer wings lowered for field use, the toolbar engaged with the ground, and the toolbar with the wings raised for end row turns.

DETAILED DESCRIPTION OF THE ILLUSTRATED EMBODIMENT

Figure 1:
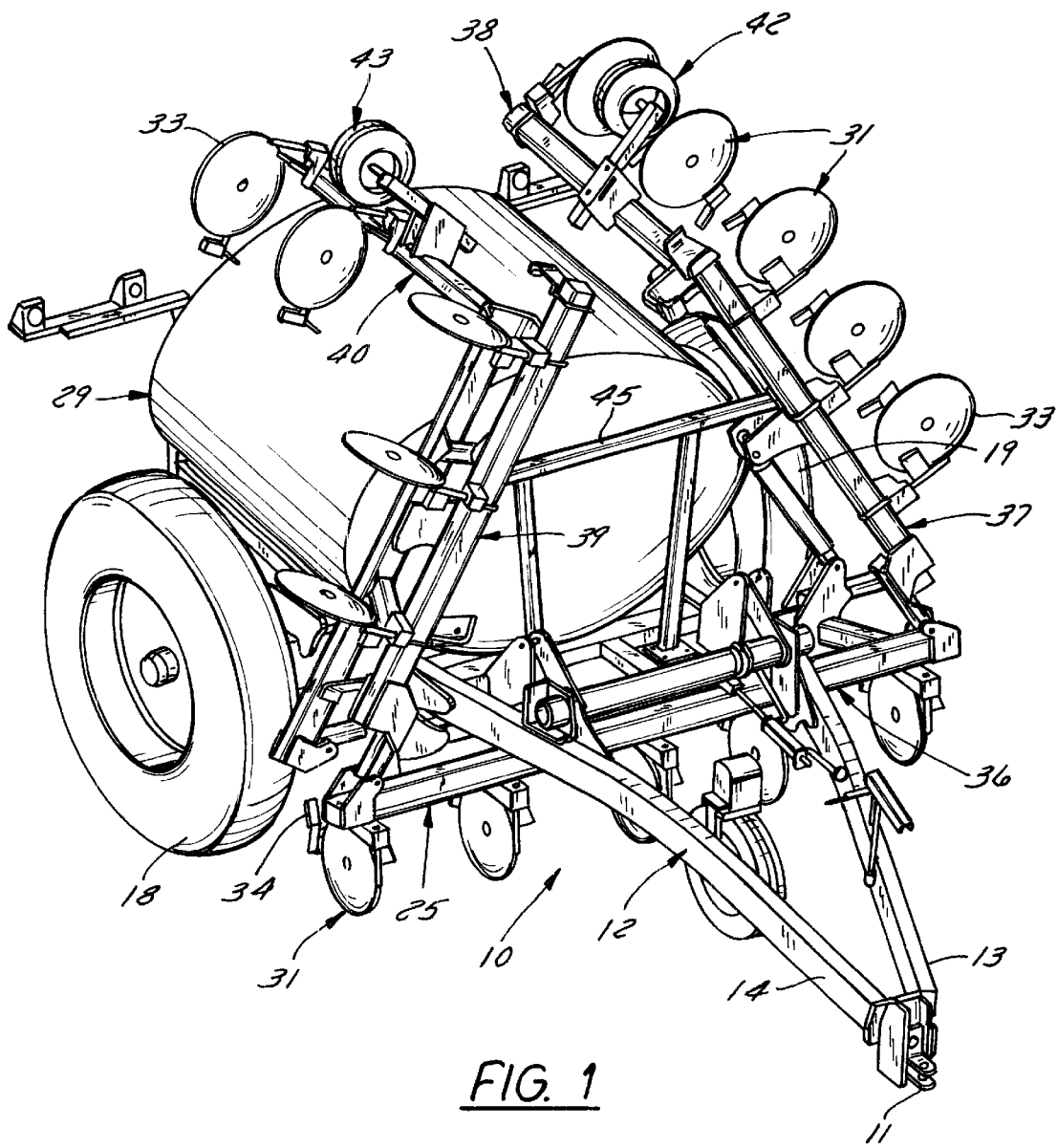
FIG. 1 is an upper, perspective view taken from the right front of an agricultural liquid fertilizer application implement, in the folded configuration for transport, constructed according to the present invention.
Figure 2:
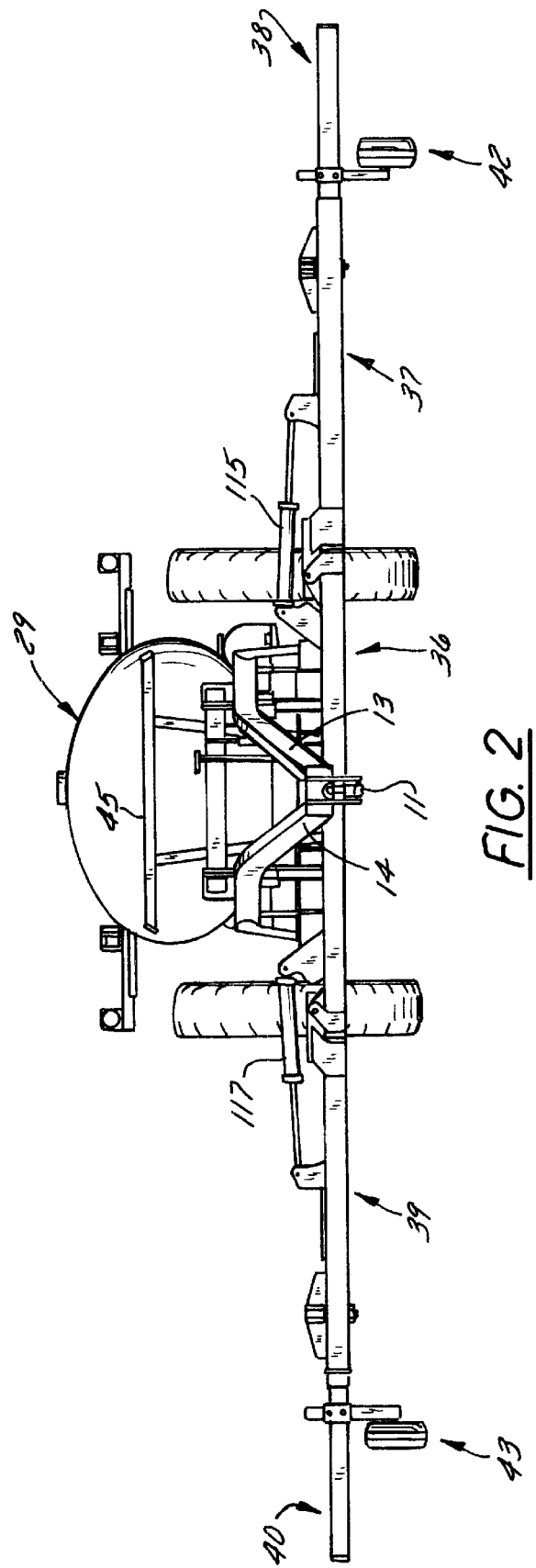
FIG. 2 is a front elevational view of the implement of FIG. 1 with the wings unfolded to the horizontal position, and with the applicator tools removed for brevity.

Referring to FIG. 1, reference number 10 generally designates a liquid fertilizer application implement which includes a conventional tractor hitch 11, and a main frame generally designated 12. The main frame, or pull frame as it is sometimes called, includes two main diverging tubular members designated 13 and 14, respectively. Tubular frame members 13, 14 are fixed at their forward ends to the hitch 11, and as they extend rearwardly, they are formed upwardly and they diverge. Thereafter, just behind the toolbar (designated 25), the frame members 13, 14 are fixed by plates (see 26 in FIG. 5) to a transverse frame member 16 which is part of a rectangular frame generally designated 17. A conventional axle assembly is mounted to two main support wheels 18, 19.

Figure 5:
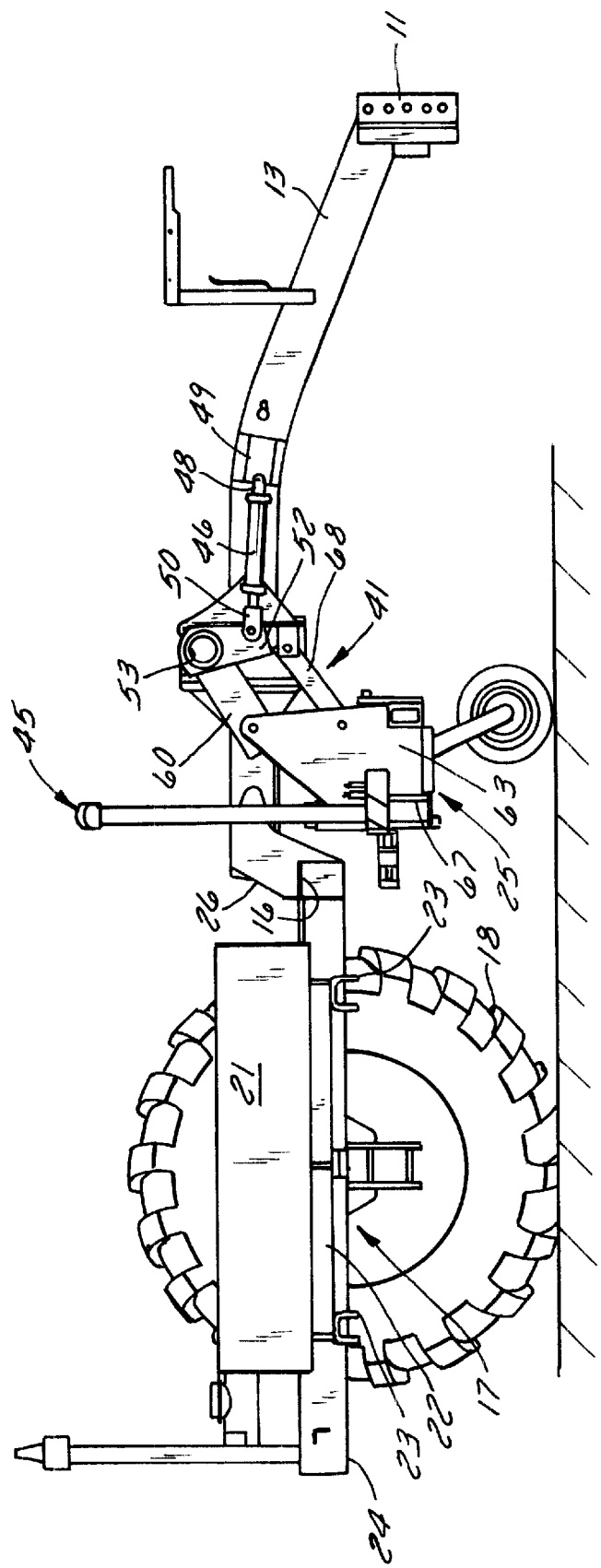
FIG. 5 is a vertical elevation view taken along the longitudinal center line of the implement of FIG. 1, with the liquid fertilizer storage tank removed.

Referring particularly to FIG. 5, a tank support, the left half of which is seen in FIG. 5 and designated 21, is mounted to the horizontal frame 17.

A tank generally designated 29 in FIG. 1 is supported on the tank support 21 which, in turn, is supported by the longitudinal frame members 22 mounted to the transverse frame members 23 which extend between the longitudinal frame members 24 of the rectangular 17.

The tank 29 stores the liquid fertilizer to be deposited by conventional applicator tools 31 (shown in envelope for brevity) carried by the toolbar 25 at the desired lateral spacing. The applicator tools 31 may be conventional, each including a rippled coulter such as those seen in envelope and designated 33 in FIG. 1 and a delivery hose coupled to an injector, such as the one designated 34. The delivery tube is conventionally routed behind the coulter 31, and coupled to a pump which forces liquid fertilizer from within the tank 29 to the delivery tube and the injector, depositing the liquid fertilizing at the base of a furrow formed in part by the rippled coulters 33, as is known in the art.

Turning now to FIGS. 1, 2, 3 and 4, the toolbar 25 includes a center section generally designated 36, a left inner wing section 37, a left outer wing section 38, a right inner wing section 39, and a right outer wing section 40. Together, an inner wing section and its associated outer wing section form a "wing." However, the term "wing" as used herein is intended to include a single wing section since, as will be disclosed, the outer wing sections may be removed, if desired, for certain applications.

As will be described in more detail below, the center section 36 and inner wing sections 37, 39 include a double-rank toolbar (that is, they each include a transverse forward mounting bar and a transverse rear mounting bar). The outer wing sections 38, 40 each have a single toolbar. The inboard ends of the inner wing sections 37, 39 are pivotally connected or hinged to the adjacent outboard ends of the center frame section 36 so that the inner wings may pivot vertically about horizontal axes extending parallel to the direction of travel of the implement. The outer wing sections 38, 40 are pivotally connected to the outboard ends of the rear mounting bars of the inner wing sections 37, 39, respectively, for pivotal motion about respective vertical axes. Thus, as seen in FIG. 1, when the toolbar is folded for transport, the center section 36 and inner wing sections 37, 39 form a general delta shape when viewed from the front, with the inner wing sections extending upwardly and inwardly, resting upon a wing support designated 45 which is mounted to the main frame 12. The outer wing sections 38, 40 extend generally parallel to the direction of travel in the folded position for transport, as seen in FIG. 1.

A conventional depth gauge wheel assembly 42 supports the left outer wing 38; and a similar depth gauge wheel assembly 43 supports the right outer wing 40.

Figure 6:
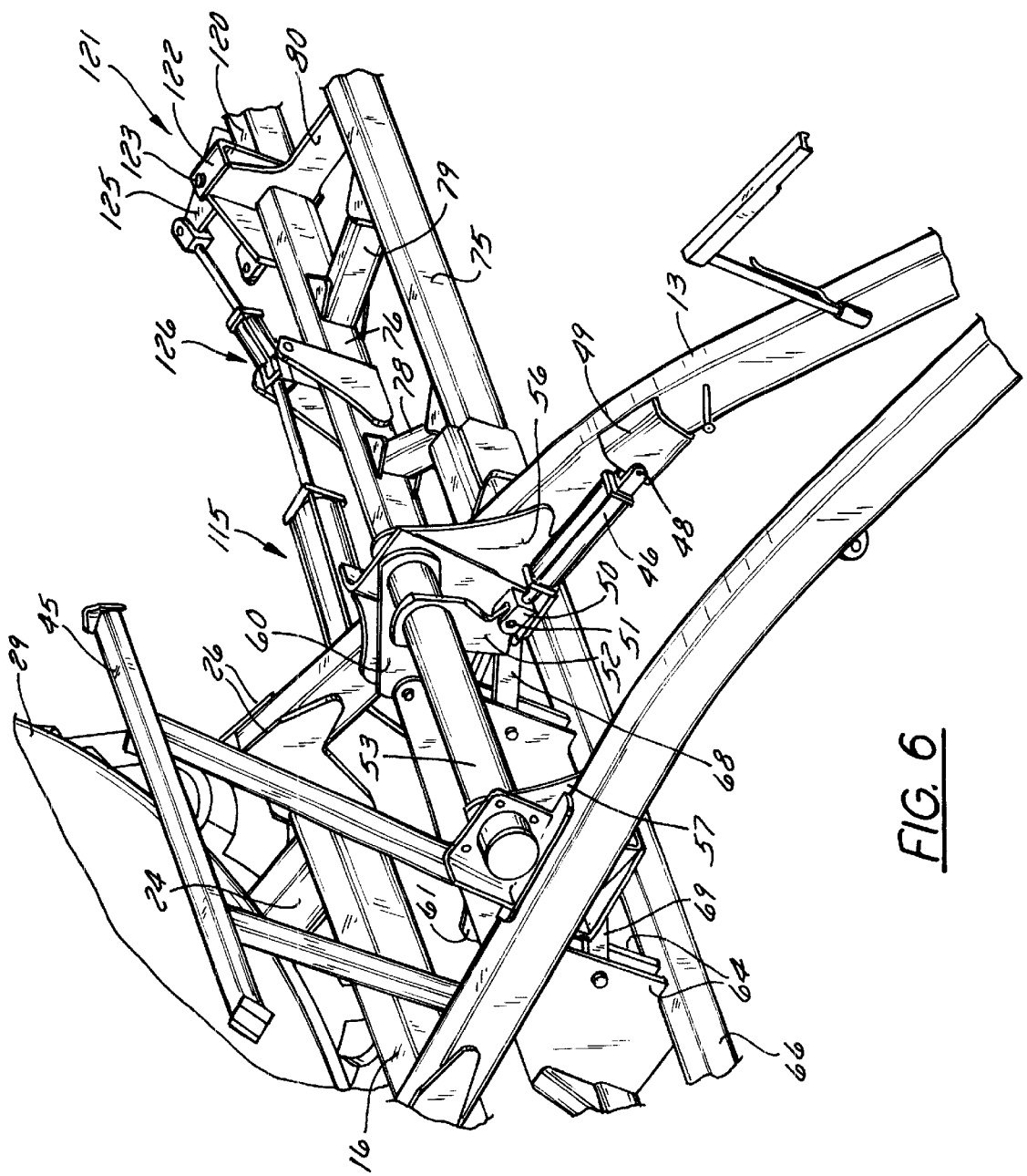
FIG. 6 is a close-up, fragmentary perspective view, taken from an upper, right perspective, showing the connection between the center section frame and the main pull frame.

The toolbar 25 is mounted to the main frame 12 by means of a four-bar linkage generally designated 41 in FIG. 5 actuated by a hydraulic cylinder and unit, sometime referred to as the "center" or main hydraulic lift cylinder generally designated 46 in FIGS. 5 and 6. The cap or butt end of the hydraulic cylinder 46 is pivotally connected at 48 to a mounting lug 49 fixed to frame member 13. The rod end of the hydraulic cylinder 46 includes a clevis 50 which is pivotally connected at 51 to a lug or crank arm 52, which, in turn, is welded to a rock shaft 53 journaled, at it ends, in mounting brackets 56, 57 which are welded, respectively, to the main frame members 13, 14.

At the outboard ends of the rock shaft 53 are provided a pair of lift arms 60, 61, the distal ends of which are pivotally connected to left and right pairs of mounting plates 63, 64 which are mounted to front and rear mounting bars 66, 67 of the center section frame. The four-bar linkage also includes lower links (such as the left one designated 68 in FIGS. 5 and 6) which are pinned at their forward ends to suitable brackets fixed to the plates 56, 57 and pinned at their rear ends to the lift plates 63, 64. In operation, when the center cylinder 46 is extended, it rotates the rock shaft 53 clockwise when viewed from the right, causing the lift arms 60, 61 to raise the pairs of mounting plates 63, 64, thereby raising the center section 36 (and the entire toolbar if the wings are folded or raised, as will become apparent).

The forward and rear mounting bars 66, 67 of the center section 36 are formed into a rigid frame or toolbar by the previously described mounting plates 63, 64, all of which are welded to both the forward mounting bar 66 and the rear mounting bar 67. In addition, as can be seen from FIG. 3, intermediate frame members 69 are also welded between the forward and rear mounting bars 66, 67 to add rigidity. It will also be observed that the intermediate frame members 69 are inclined or "diagonal" relative to the direction of travel. This inclination of the intermediate frame members enhances the adjustability of mounting the working tools at a particular location on one or the other of the forward and rear mounting bars. That is, at the lateral location where the offset intermediate frame member is welded to the rear mounting bar, the forward mounting bar is free for mounting tools. Conversely, at the lateral location where the front ends of the inclined intermediate frame members are welded to the forward mounting bar, the corresponding lateral location on the rear mounting bar is free for mounting tools (typically by means of a single U-bolt such as is designated 130 in FIG. 4).

As will be further described presently, the length of the forward mounting bar 66 is greater than that of the rear mounting bar 67 of the center section so that the outboard ends of the front mounting bar 66 are each located laterally outboard of the associated outboard ends of the rear mounting bar. The purpose for this, as will become clear, is to provide, in combination with SR a unique hinge structure, the same adjustability of mounting feature just described, leaving at all later locations, either the front mounting bar or the rear mounting bar free to mount a tool. The mounting bars of the inner wing sections are adjusted in length so that, in the field use position, the inboard end of a rear mounting bar of a wing section lies adjacent the outboard end of the rear mounting bar 67 of the center section, and the same is true of the corresponding forward mounting bars.

Turning then to the structure of the inner wing sections, both the inner wing section and the outer wing section of one wing are similar, but in mirror image, with the wing section of the other side, so that only one wing need be described in detail for an understanding of both wings.

Figure 3:
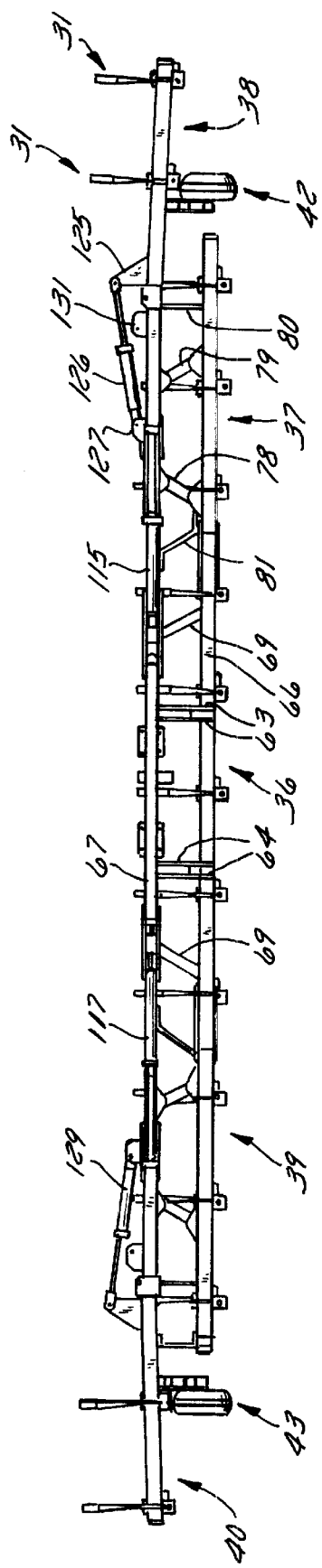
FIG. 3 is a plan view of the double-rank toolbar of the implement of FIG. 1 in the unfolded position.
Figure 7:
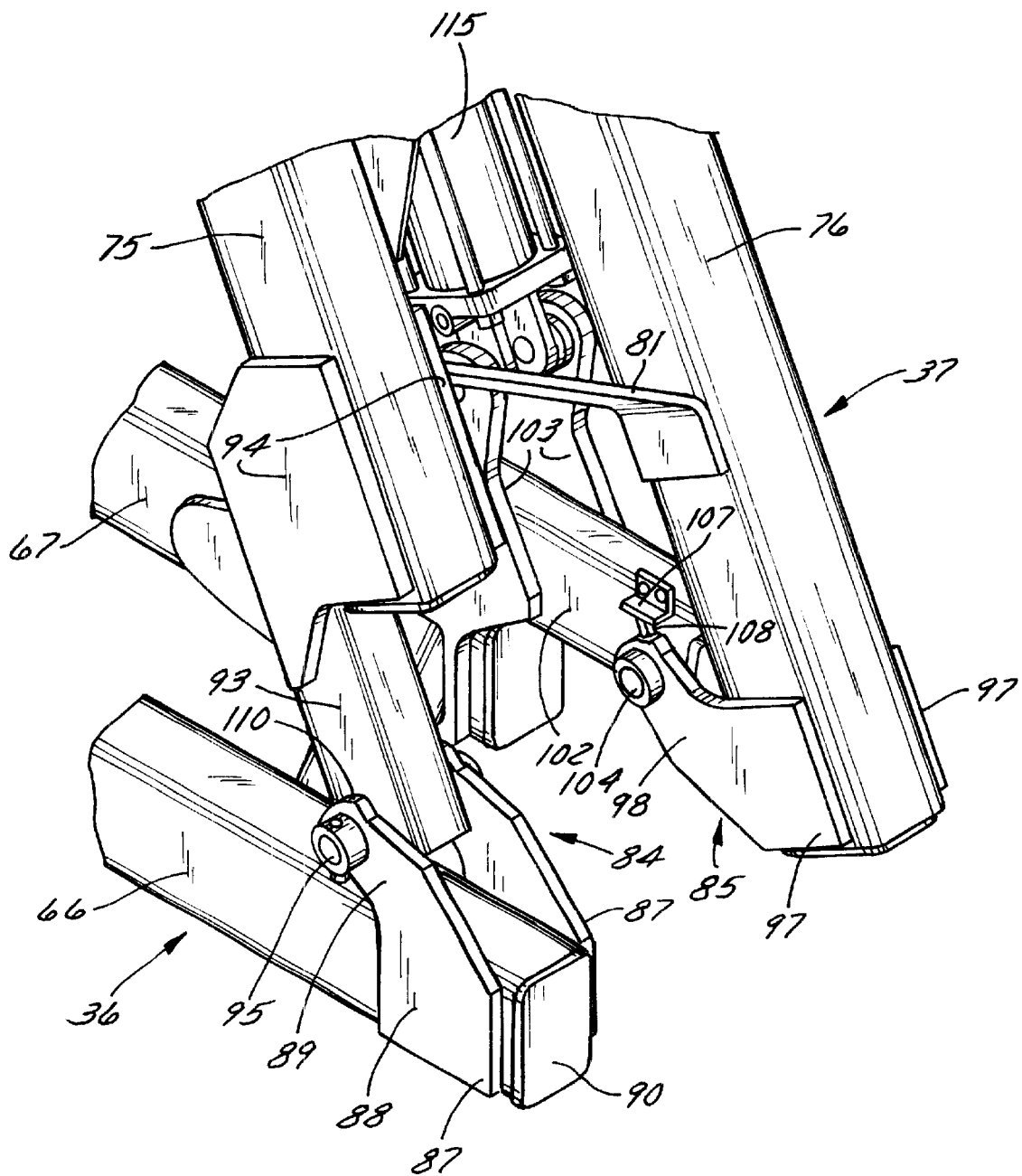
FIG. 7 is a close-up, fragmentary, perspective view, taken from an upper, frontal perspective view showing the hinge structure between the center section frame and the left wing section folded for transport.

Referring now to FIGS. 3, 6 and 7, the left inner wing section 37 includes a forward mounting bar 75 and a rear mounting bar 76 formed into a rigid frame by means of two inclined tubular intermediate frame members 78, 79, as well as an outboard end plate 80 (FIG. 6) and an inclined inboard brace 81 (FIG. 7), all of which are welded at their front ends to the forward mounting bar 75, and at their rear ends to the rear mounting bar 76 of the left wing section.

Figure 8:
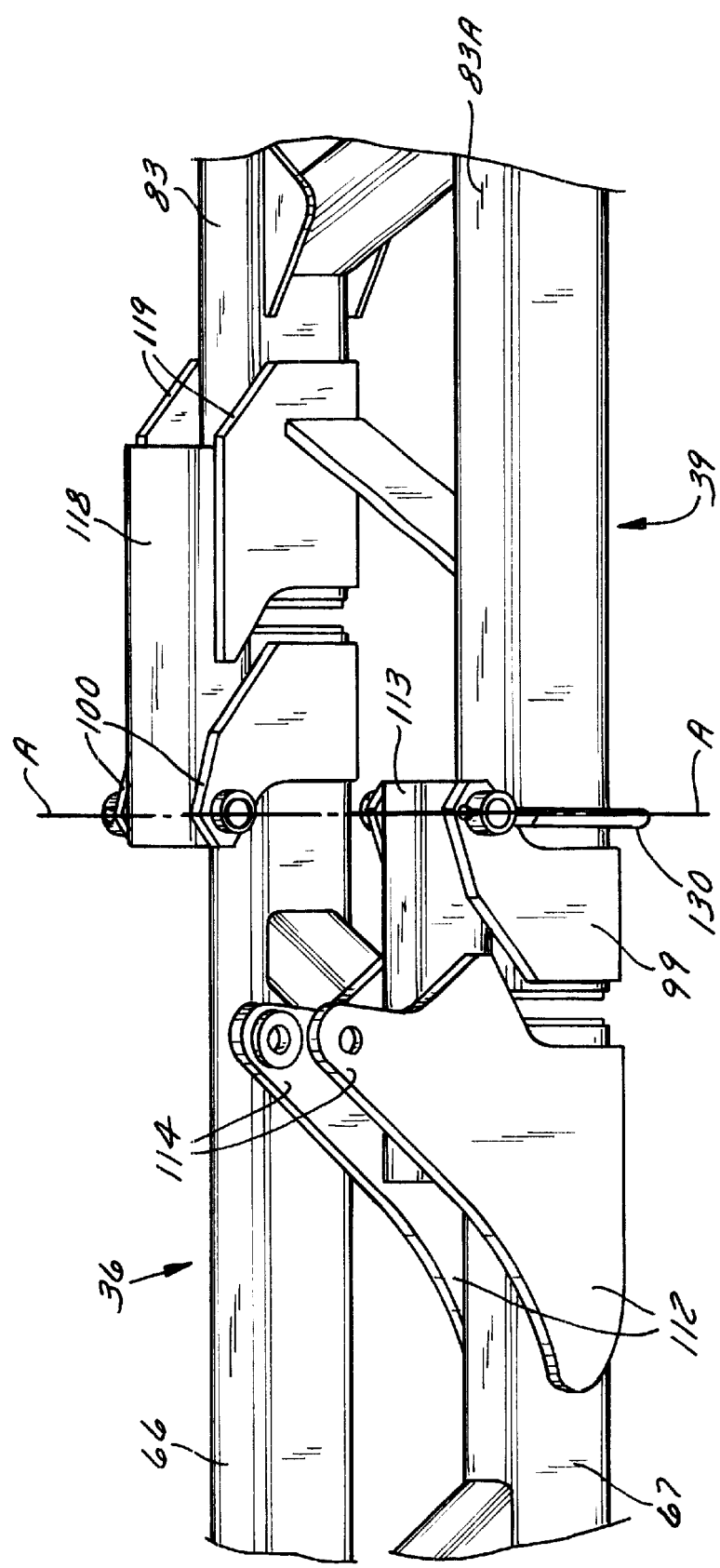
FIG. 8 is an upper perspective view taken from the rear of the hinge connection between the right side of the center section frame and the right inner wing section, with the inner wing fold cylinder removed for clarity.

The hinge between an inner wing section and the center frame section is best understood by references to FIGS. 7 and 8, in which it will be observed that FIG. 7 is a frontal view of the hinge between the center frame section 36 and the left inner wing section 37, with the wing in the folded or transport position, and FIG. 8 is a view from the rear between the center frame section 36 and the right inner wing section 39. The front and rear mounting bars for the right inner wing section 39 are designated respectively 83, 83A in FIG. 8.

Referring now to FIG. 7, the hinge for the forward mounting bars 66, 75 is generally designated 84; and the corresponding hinge for the rear mounting bars 67, 76 is generally designated 85.

The forward hinge 84 includes a pair of mounting plates 87 which are similar and form a trunnion mount. Each of the mounting plates 87 includes a base 88 and an upper lobe 89, which in the case of the hinge 84 extends inwardly toward the center line of the implement and away from the outboard end 90 of the forward mounting bar 66. Base portions 88 are welded to the forward and rear surfaces of the forward mounting bar 66. A short tubular extension member 93 is fixed by means of plates 94 to the inboard end of the forward mounting bar 75 of the inner wing section 37; and the inboard end of the extension member 93 is pivotally mounted to the hinge plates 87 by means of a pin 95. Thus, the hinge axis of the pin 95 is above and inboard of the end 90 of the forward mounting bar 66.

Turning now to the hinge 85 for the corresponding rear mounting bars 67, 76, hinge plates 97 which may be identical to the previously described hinge plates 87, are welded to the front and rear surfaces of the rear mounting bar 76 of the inner wing section 37. However, the disposition of the hinge plates 97 is such that their associated lobes 98 extend upwardly and outwardly of the inboard end of the mounting bar 76 when it is in a horizontal disposition (see the corresponding hinge plate designated 99 in FIG. 8 for the rear mounting bar 83A of the right inner wing section 39).

Similarly, as can be seen in FIG. 8, the corresponding hinge plates 100 welded to the right side of the forward mounting bar 66 of the center section, has its lobe extending upwardly and inwardly so that the pivot axes of the associated hinge pins lie along a common axis designated A in FIG. 8.

Returning to FIG. 7, an upper extension member 102 is affixed to the top of the rear mounting bar 67 by means of plates 103 which are welded, respectively, to the front and rear surfaces of the rear mounting bar 67. The outboard end of the extension 102 is pivotally connected to the hinge plates 97 by means of a pin 104, the axis of which is collinear with the axis of the previously described pin 95 to form a hinge between the center frame section 36 and the left inner wing section 37.

As also seen in FIG. 7, a limit switch 107 is mounted to the frame extension member 102, and it includes an actuator 108 which rides on the edge of the lobe 98 of hinge plate 97. Each of the hinge plates 88, 97, 99, 101, as mentioned, may be similar. Turning particularly to the hinge plate 88, the edge of the lobe 89 includes a raised cam surface 110. The corresponding cam surface for the rear hinge plate 97 cannot be seen in the view of FIG. 7 because with the wing in the raised or folded position, the cam surface is hidden by the pin 104 and its bushing. However, when the left wing section 37 is rotated downwardly, the cam surface engages the actuator 108 of the limit switch and closes its contacts. This occurs before the wing section reaches horizontal. The cam surface 110 also actuates the limit switch when the left wing section 37 is raised from the horizontal position. There is hysteresis in the actuating action of the cam 110, as will be further described below.

Returning now to FIG. 8, mounting plates for the right side of the rear mounting bar 67, similar to those designated 103 in FIG. 7, are designated 112 in FIG. 8, for mounting an extension member 113, similar to previously described members 93, 102. It will be observed that each of the hinge plates 112 extends upwardly above the extension tube 113 which is welded to the plates 112. These upper extensions form mounting ears 114 to receive a pivot pin for pivotally mounting the case end of an inner hydraulic wing fold cylinder (see the corresponding hydraulic cylinder designated 115 in FIG. 7). These hydraulic cylinders are sometimes referred to as "inner wing fold cylinders", and the function of the left wing fold cylinder 115 is to rotate the left inner wing section 37 between the extended or field use position shown in FIG. 6, and the folded or transport position shown in FIG. 7. The corresponding inner wing fold cylinder for the right inner wing section 39 is designated 117 in FIGS. 3 and 4. The butt end of the inner wing cylinder 117 is pivotally mounted to the ears 114 of the hinge plates 112 of FIG. 8 and the rod end is suitably mounted to the rear mounting bar 83A of the right inner wing section 39.

The forward mounting bar 83 of the right wing section 39 is pivotally mounted to the forward mounting bar 66 of the center section by means of an upper extension frame 118 fixed to mounting bar 83 by plates 119 and pivotally mounted at its inboard end to the plates 100 fixed to forward mounting bar 66. The pivot axes of the front and rear hinges are aligned along line A, as mentioned.

Figure 4:
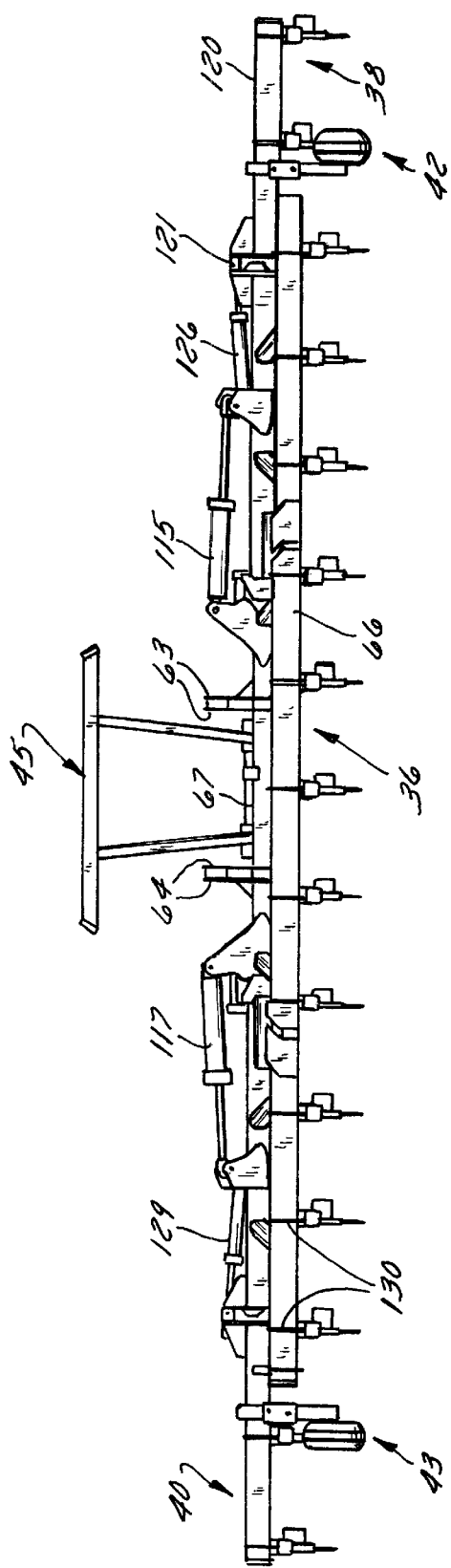
FIG. 4 is a frontal view of the toolbar of FIG. 3 taken from a slightly elevated position.

Referring now to FIGS. 3 and 4, each of the outer wing sections 38, 40 are similar, so only the left outer wing section 38 will be described in detail. Persons skilled in the art will readily appreciate that the right outer wing section 40 is a mirror image of the left outer wing section 38.

The left outer wing section 38 includes a single tubular mounting bar 120. The gauge wheel assembly 42 is mounted to the mounting bar 120, as are the liquid fertilizer applicator tools 31 (see FIG. 3).

The inboard end of the mounting bar 120 is pivotally mounted by means of a C-shaped trunnion hinge plate 122 (FIG. 6) to a vertical hinge pin 123 which is mounted to the outer plate 80 of the inner wing section frame, suitably braced.

To the rear of the mounting bar 120, a lug or arm 125 is pivotally mounted to the rod end of a hydraulic cylinder 126 (sometime referred to as an "outer wing fold cylinder"). The butt end of the outer wing fold cylinder 126 is pivotally mounted to a plate 127 (FIG. 3) welded to the rear surface of the rear mounting bar 76 of the left inner wing section. A corresponding right outer wing fold hydraulic cylinder for the right side outer wing 40 is shown at 129 in FIGS. 3 and 4. When actuated, the outer wing fold cylinders 126, 129 fold the outer wing sections about axes which are vertical when the toolbar is in the horizontal position. Rather, as will be further understood from subsequent description, the outer wing cylinders are folded in a plane parallel to the extension of the associated inner wing toolbars.

It will be observed from FIGS. 3 and 4 that the fertilizer applicator tools 31 are located on the front mounting bars for the center section 36 as well as for the left and right inner wing sections 37, 39; and they are mounted to the single mounting bar of the outer wing sections. This is mainly for aesthetic purposes, and the toolbar shown and described above is designed for this arrangement with a thirty inch row spacing, which is a common spacing. In order to achieve other spacings, individual fertilizer applicators may have to be mounted (typically by means of a conventional U-bolt as seen at 130 in FIG. 8) to a rear mounting bar on either the center section or an inner wing section. In any case, because of the double-rank structure of the toolbars, the structure of the overhead hinges described above, and the use of inclined or diagonal intermediate frame members such as those designated 69, 78 and 79 in FIG. 3, the placement and spacing of fertilizer applicator tools is substantially universal, including the ability to place one of the fertilizer applicator tools immediately below the hinges between an inner wing section and the center frame section, as illustrated at 130 in FIG. 8. Moreover, if it is desired to remove the wing sections to convert the implement to a twelve-row applicator at a thirty-inch row spacing, the hinge pins such as that designated 121 in FIG. 3 are removed, and the rod end of the outer wing hydraulic cylinders 126, 129 are disconnected from the crank plates, such as the one designated 25, and pinned to an auxiliary plate designated 131 in FIG. 3 welded to the rear surface of the rear mounting bar 76 of the left wing section.

Hydraulic Circuit and Operation

Figure 20:
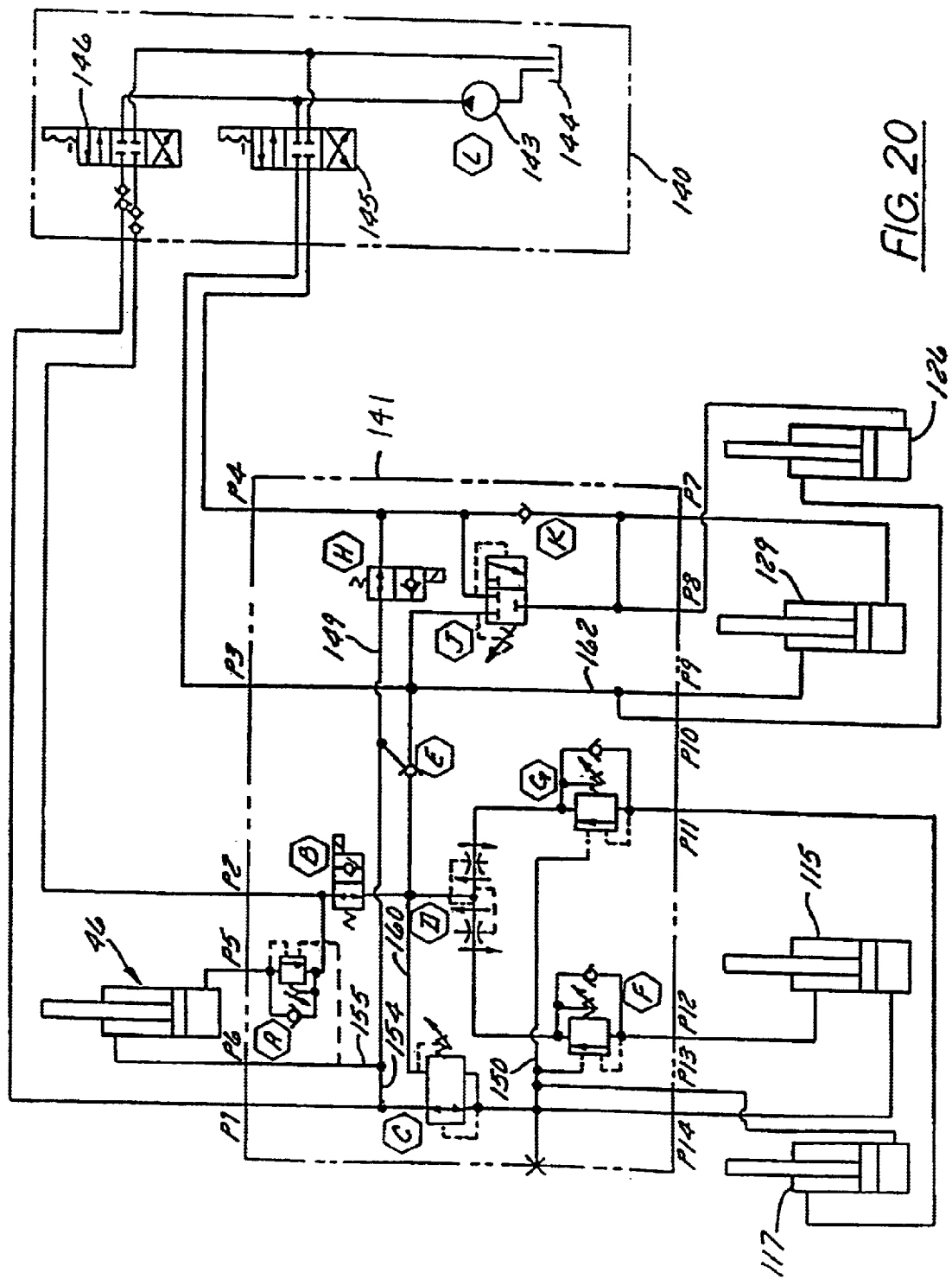
FIG. 20 is a schematic diagram of the hydraulic control circuit for the implement of FIG. 1.

Turning now to FIG. 20, there is shown a schematic of the hydraulic circuit for operating the main or center lift cylinder 46, the two inner wing fold cylinders 115, 117, and the two outer wing fold cylinders 126, 129. The hydraulic cylinders are designated with corresponding numbers in the schematic of FIG. 20.

The portion of the hydraulic circuit located in the tractor is included within the chain line block 140, and the remainder of the hydraulic valves are located within a manifold schematically represented in FIG. 20 by the chain line 141. Shown in a more structural representation in FIG. 6 is the manifold block 141. The tractor hydraulics 140 includes a pump 143, a tank or reservoir schematically shown at 144, and first and second directional control valves designated respectively 145, 146 and referred to as the "transport" and "work" valves respectively. The directional control valves 145, 146 have a closed center position, and first and second end positions representing "forward" flow and "reverse" flow. The forward flow position is schematically represented at the top of each of the directional control valves 145, 146 and the reverse flow position is shown at the bottom.

Turning now to the manifold 141, it includes fourteen ports, designated, respectively, P1–P14 in FIG. 20. Within the manifold 141, there are ten individual valves, each being designated by a letter enclosed within a hexagon. Thus, the valves are designated A, B, C, D, E, F, G, H, J and K. The valves A, F and G are counterbalance valves. Valves B and H are solenoid-actuated, normally open, two-way poppet valves. Valve C is a pilot-operated, pressure reducing/relieving valve. Valve D is a flow divider/combiner valve. Valve E is a pilot-operated check valve. Valve J is a sequence valve with an internal pilot, and valve K is a check valve. All of the valves are conventional in themselves, and commercially available.

The operation of the hydraulic circuit shown in FIG. 20, and the individual components of it, will be described in connection with the various operational cycles of the implement disclosed above. The primary cycles of operation with the hydraulic circuit will be referred to as "Fold," "Unfold," "End Row Turns," and "Work." Briefly, the "Fold" configuration is that shown in FIG. 1 in which the implement is ready for transport. The "Unfold" cycle unfolds the wings to a generally horizontal, though slightly upwardly concave position. The "End Turn" cycle raises the toolbars from the field use or "Work" position to a generally horizontal position, raising the tools to disengage the soil for turning the implement at the end of a row. The "Work" position is the field working position wherein all of the fertilizer applicator tools are disposed at their operating depth and a constant hydraulic pressure is maintained on the cylinder end of the inner wing fold cylinders 115, 117 to maintain a constant downward force on the wings.

Figure 14:
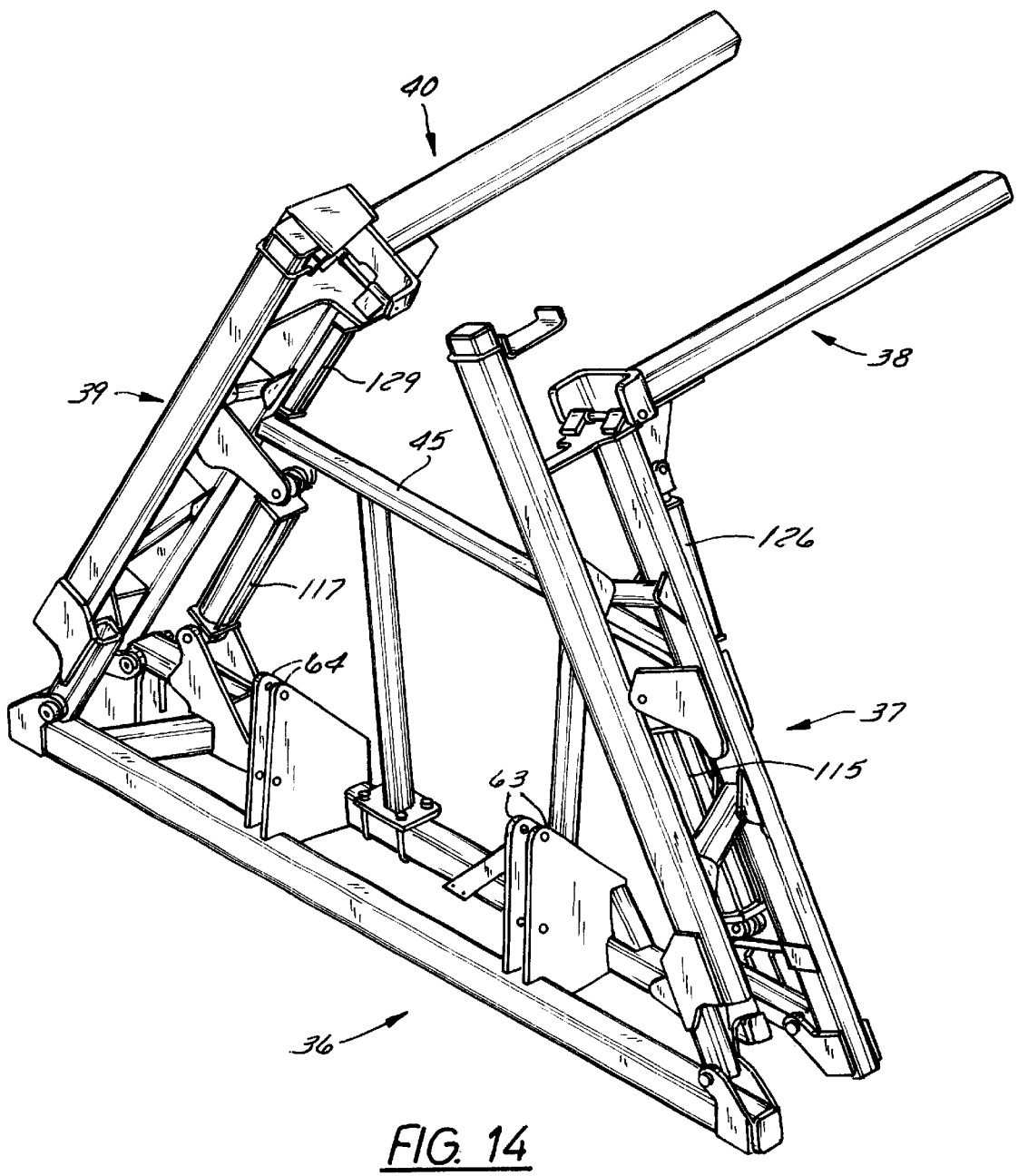
FIGS. 14–16 are upper, left frontal perspective views of the frames for the center section and the wing sections showing, respectively, the complete folded position for transport, a partially unfolded position wherein the outer wing sections have not been unfolded, and the complete unfolded position.

The fold or transport configuration is also illustrated in FIG. 14 wherein the center section 36 is horizontal, the inner wing sections 37, 39 extend upwardly and inwardly, resting on the support 43 and the outer wing sections 38, 40 are substantially horizontal and extend rearwardly. FIGS. 14–19 show only the primary elements of the frames associated with the toolbar, in order to illustrate the various positions of the toolbar components in the various cycles of operation of the hydraulic system.

Unfold Cycle

The "Ufold" cycle begins with the wings fully folded in the fold configuration and resting on the support 43, as seen in FIG. 1. To begin the "Unfold" cycle, the operator actuates and holds the lever for the transport valve 145 in the reverse position. Hydraulic fluid under pressure is communicated from the pump 143 through the transport valve 145 to port P4 in manifold 141. Valve His in the normally-open position shown in the schematic, and pressurized fluid is communicated through valve H to the line 149. Check valve E is therefore pilot-operated to the open position, and the fluid is further communicated to the pressure reducing/relieving valve C via line 154. Valve C also is open at this time. Thus, pressurized fluid is transmitted to line 150, and thus to the case or piston end of the inner wing fold cylinders 115, 117, causing them to begin to extend, thereby rotating the wings (including both inner wing sections and outer wing sections) off the support 43.

Figure 9:
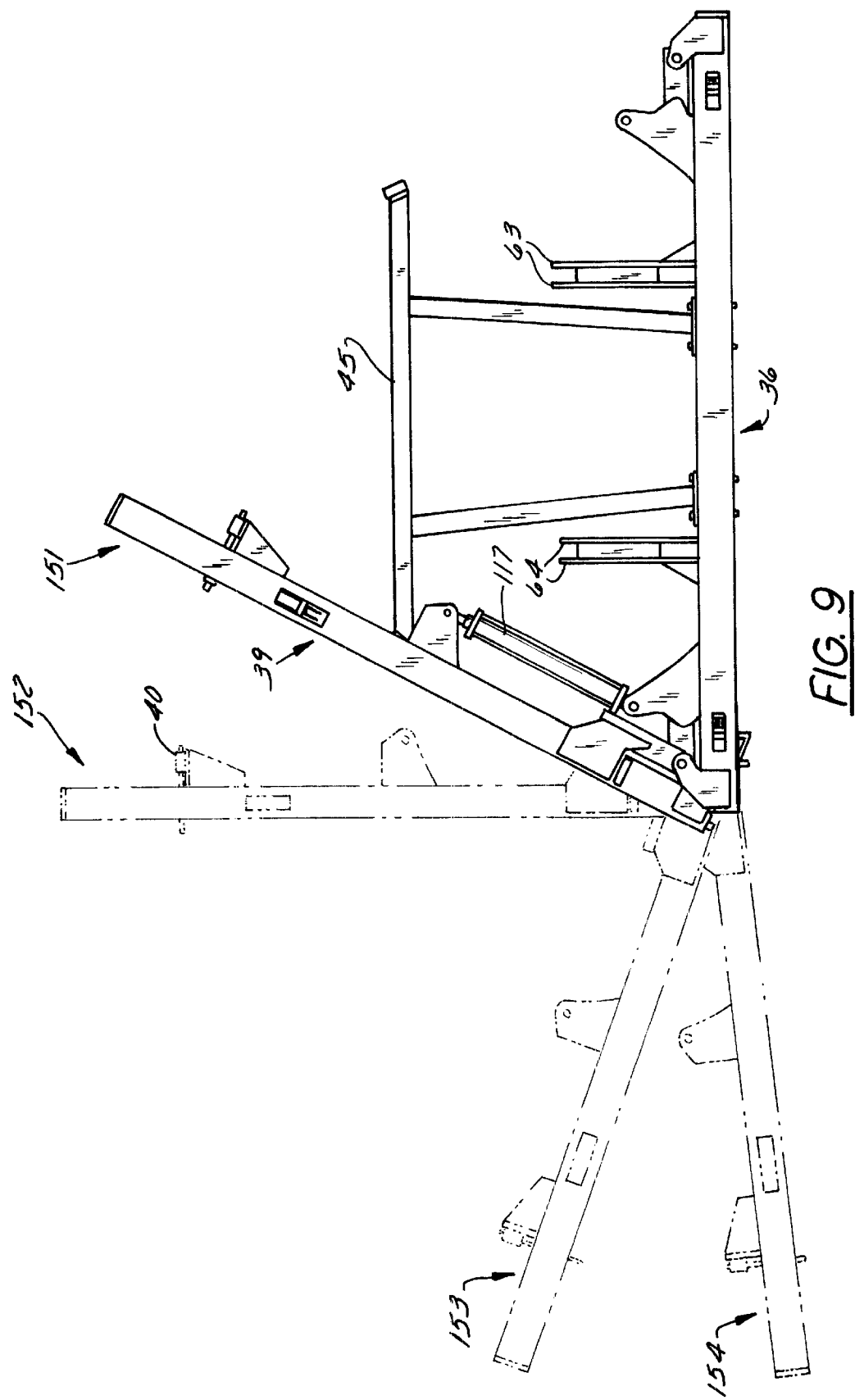
FIG. 9 is a front elevational view of the center section toolbar and right inner wing section toolbar, with the right wing section shown in various positions illustrating the operation of the implement.

The weight of the wings in the fold configuration creates a back pressure on the rod ends of the inner wing fold cylinders 115, 117. The hydraulic pressure from the tractor must overcome the back pressure induced by the weight of the wings before the wings begin to rotate. However, the pressure necessary to overcome the back pressure on the inner wing fold cylinders is less than the maximum tractor hydraulic pressure, so the wings begin to rotate from the fold configuration to a vertical position which is illustrated at 152 in FIG. 9 for the right inner wing section 39. It will be observed that the right outer wing section 40 remains in the fully folded configuration during this initial phase. This is because the pilot pressure at the sequence valve J is insufficient to actuate the valve. However, the pilot pressure settings for the counterbalance valves F and G (10:1) is substantially below that required for counterbalance A (3:1), as well as for sequence valve J. By way of example, counterbalance valve A has a three-to-one ratio, whereas the counterbalance valves F and G have a ten-to-one ratio, meaning that the valves F and G will open at a much lower pilot pressure than valve A. Thus, counterbalance valves F and G are piloted open, thereby permitting fluid to return from the rod ends of the inner wing fold cylinders 115, 117 through the counterbalance valves F and G and the flow divider/combiner valve D, check valve E (which, it will be recalled, is piloted to the open position) and port P3 on the manifold 141, through the transport valve 145 to the tractor reservoir 144. In other words, when the sum of the pressures at valves F and G is greater than the pressure setting for the valve spring of the counterbalance valve, the spool shifts and return flow is permitted through the path indicated.

During the Unfold cycle, pressure reducing/regulating valve C remains open because the input pressure is not high enough to actuate the pressure reducing mechanism of the valve. The result is that the inner wing fold cylinders extend equally because the divider/combiner valve D establishes equal fluid flow from the inner wing cylinders in this cycle. Thus, the inner wing fold cylinders continue to extend, unfolding the inner wing sections.

When the inner wing fold cylinders have extended to the point that the inner wing sections are vertical (position 152 in FIG. 9), the wing sections travel over-center, and gravity tends to pull the wings down, whereas during the first phase of the Unfold cycle described above, gravity tended to maintain the wings in the Transport configuration 151. The result is that the gravity-induced pressure in the inner wing cylinders 115, 117 shifts from the butt end of the cylinder (position 151) to the rod end of the cylinder as the wing passes through the vertical (position 152 in FIG. 9). This pressure adds to the tractor hydraulic pressure tending to extend the inner wing fold cylinders 115, 117.

With the operator continuing to hold the transport control valve in the reverse (unfold) position, pressure from the tractor hydraulic system continues at port P4, with return flow at port P3. The gravity-induced pressure on the rod end of the inner wing fold cylinders increases as the inner wing sections unfold (position 153, 153 for the right inner wing section 39). During this phase of the cycle, counterbalance valves F and G remain pilot-operated permitting return flow to the tractor reservoir in a controlled manner due to the restricted return flow. That is, the wings do not drop uncontrolled to the extended horizontal position due to the action of the piloting at the counterbalance valves F and G, as persons skilled in the art will appreciate. During this phase of the Unfold cycle, valves A and J are not pilot-operated and remain open, thereby inhibiting extension of the outer wing fold cylinders 126, 129, as well as the center lift cylinder 46, preventing the center section from being lowered to the Work position.

Figure 15:
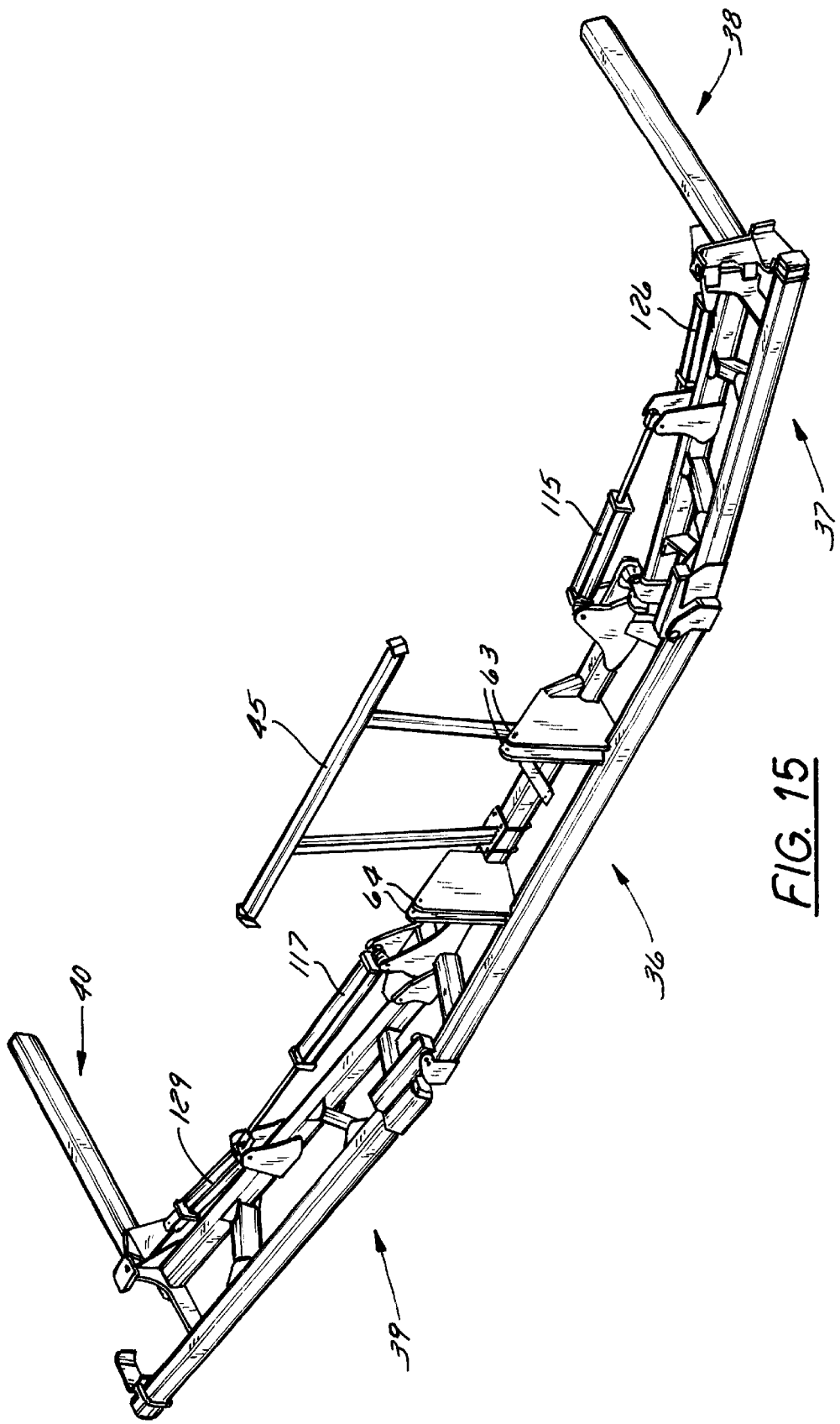

As the inner wing sections continue to rotate downwardly toward the horizontal, caused by the extension of the inner wing fold cylinders, eventually the limit switch (107 in FIG. 7 and described above), will be actuated, i.e., closed to complete the electrical circuit. This is caused by the action of the cam surface 110 on the hinge plate 97 in FIG. 7 moving the switch actuator arm 108 when the rear mounting bar 76 of the left wing section 37 reaches a position slightly above horizontal. This is illustrated by the position 153 in FIG. 9 for the right wing section 39. When the limit switch 107 is actuated, sequence valves B and H are enabled (i.e., energized). When the valve H is enabled, the spool moves to the check valve position, thereby cutting off pressure from port P4 to the pilot-operated check valve E and precluding the return of hydraulic fluid to the tractor reservoir. This essentially locks the inner wing fold cylinders in a position of slight inclination (the "intermediate fold position"). The amount of inclination is not critical, but some elevation is preferred. This position is illustrated in FIG. 15 and is sometimes referred to as the Intermediate Fold position since the outer wing sections remain folded, as seen in FIG. 15.

Figure 16:
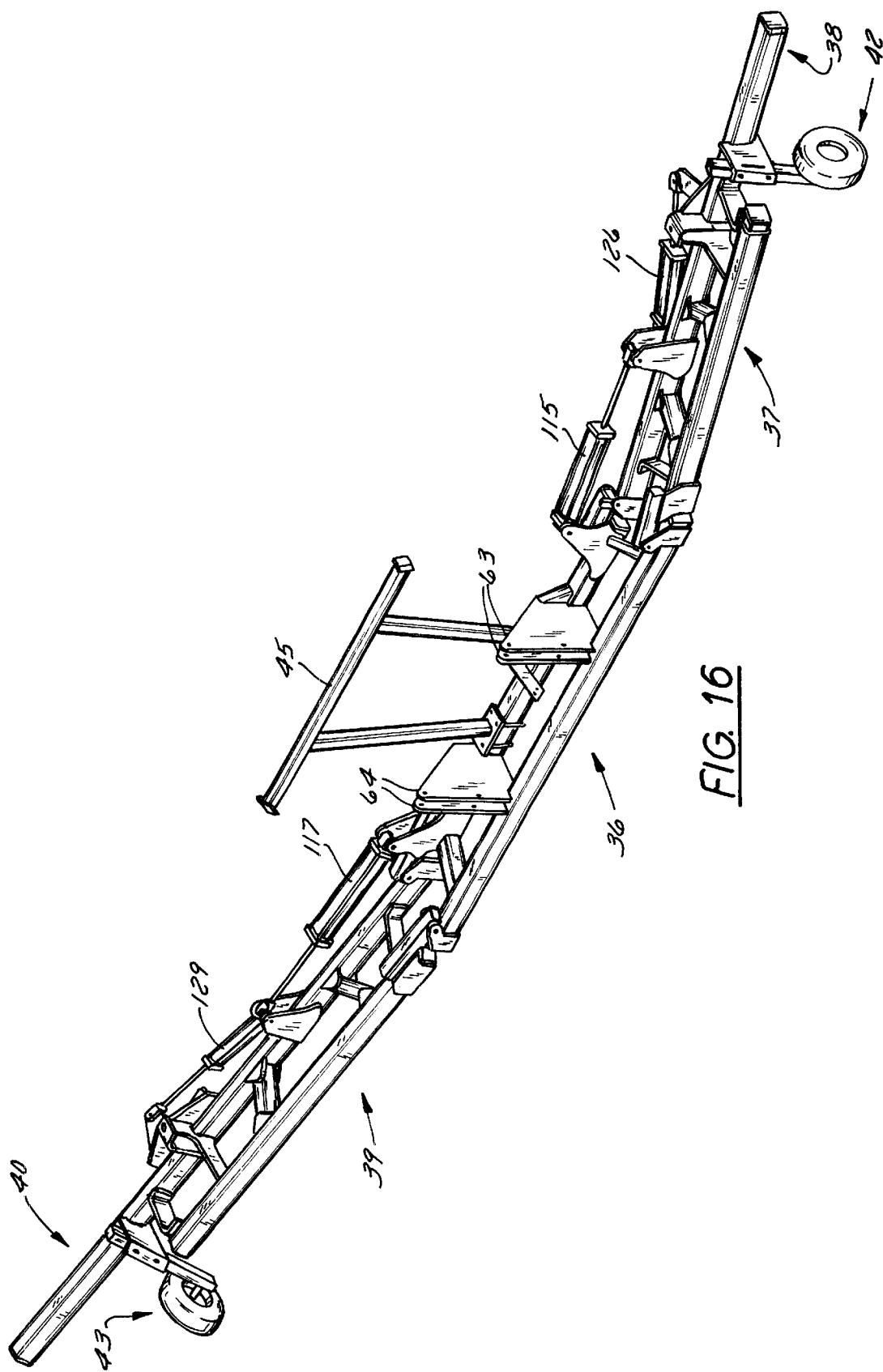

With the solenoid valve H enabled, the hydraulic pressure at port P4 increases (with the operator maintaining the reverse position of the lever for the Transport valve 145) until the hydraulic pressure at port P4 reaches the actuating pressure setting for the sequence valve J, whereupon valve J is actuated (that is, the spool is moved from the closed position seen in FIG. 20 to the flow position). Hydraulic fluid under pressure then flows through valve J and ports P7, P8 to the butt ends of the outer wing fold cylinders 126, 129, causing the outer wing fold cylinders to extend, thus rotating the outer wing sections 38, 40 outwardly from the position of FIG. 15 to the position of FIG. 16. During this phase of operation, as the outer wing fold cylinders 126, 129 extend, return fluid passes through port P3 and the transport valve 145 to the tractor reservoir. Thus, as seen in FIG. 16, the fully extended wings (including both the inner wing sections and the outer wing sections) remain elevated slightly forming a slightly concave shape with the center section with the wings fully extended. This is referred to as the Unfold position. In this position, the outer wing cylinders are extended, the inner wing cylinders are partially extended with the inner wing sections in a partially raised position, the center section lift cylinder remains extended with the toolbar raised above the Work position. The operator may then center the transport valve 145.

Work Cycle

To engage the toolbar in the Work configuration from the Unfold configuration of FIG. 16, the operator actuates the work valve 146 to the forward (or work) position causing an increase in hydraulic pressure at port P1. The work valve is 146 has a detent for the forward ("Work") position, permitting the lever to remain "locked" in the forward operating position and the toolbar lowered to the field use or work position, and permitting the operator to direct his full attention to steering and controlling the tractor.

Return flow is provided through port P2 of the manifold 141, as will become apparent. The pressurized fluid from port P1 is communicated via lines 154, 155 and port P6 to the rod end of the main lift cylinder 46, as well as through the normally-open pressure-reducing/relieving valve C to the ports P13, P14 and thence to the butt ends of the inner wing fold cylinders 115, 117. At the same time, as the hydraulic pressure increases, counterbalance valves F and G are pilot-operated to the open position via line 150, thereby establishing a return flow path from the inner wing fold cylinders 115, 117 through the flow divider/combining valve D, and the normally open solenoid-actuated pilot valve B and manifold port P2.

It is possible that pilot valves B and H are energized during this phase because the limit switch 107 may be closed for the start of the cycle, but there is free return flow through the check valve associated with the two solenoid-operated valves, as illustrated in FIG. 20. The inner wing fold cylinders begin to extend until they encounter resistance either from the ground or because the inner wing fold cylinders have reached the limits of their extension; that is, they are fully extended. Specifically, as the inner wing fold cylinders extend, the wing gauge wheels 42, 43 may engage the ground, thereby limiting further lowering of the associated wing, and setting the associated tools at the desired is operating depth. Alternatively, one or both of the wings may extend below the horizontal by a suitable angle (which may be six degrees as in the illustrated embodiment, but which is not critical and may be varied), to the position shown at 157 in FIG. 9 for the right inner wing section, in which case the right wing fold cylinder 117 becomes fully extended. In either case, fluid pressure at port P1 increases, and the toolbar moves from the intermediate position of FIG. 16 to a pre-work position of FIG. 17 in which the entire left and right wings (including both inner wing sections and outer wing sections) are extended downwardly, the associated inner wing fold cylinders are extended, but the center section 36 is still raised.

In either case, the fluid pressure to port P1 will increase and eventually the pilot pressure at counterbalance valve A will actuate that valve, thereby permitting fluid to flow from the piston end of the center lift cylinder 46 to port P5 and counterbalance valve A and thence through port P2 to the tractor reservoir 144. As the center lift cylinder retracts, the center section 36 of the toolbar lowers from the position of FIG. 17 to that of FIG. 18. FIG. 18 illustrates the work position of the toolbar on level ground, with the operating depth of the tools on the center section being set by the main wheels 18, 19, and the depth of the tools on the left and right wings be set by the wing gauge wheels 42, 43 respectively, as the tractor moves forward. When the toolbar is in the Work position just described, a conventional liquid fertilizer pump system is actuated to dispense liquid fertilizer under pressure to the individual applicator knives.

When the implement has assumed the work position, further movement of the inner and outer wing fold cylinders and the center lift cylinder is stopped, the center lift cylinder having been fully retracted and the outer wing cylinders extended (the inner wing fold cylinders may have met resistance because the gauge wheel encountered the ground). The pressure at port P1 of the manifold 141 then increases to the tractor hydraulic system maximum operating pressure. This opens the sequence valve J, and full tractor hydraulic system pressure is applied to the piston ends of the outer wing fold cylinders 126, 129 to lock them in the extended position. At the same time, the increase in pressure causes the pressure-reducing/relieving valve C to operate in the pressure reducing/relieving mode, thereby providing a substantially constant pressure at the output of valve C which is communicated via line 150 to the cylinder ends of the inner wing fold cylinders 115, 117. The inner wing fold cylinders thus operate under a constant pressure. Moreover, the check valve E is actuated via line 149, thereby permitting return flow through counterbalance valves F and G (which are actuated by the presence of system pressure on line 150) and the flow divider/combiner valve D, from the rod ends of the inner wing fold cylinders 115, 116. The outer wing fold cylinders, as mentioned, are held at full extension at full tractor hydraulic system pressure. The center lift cylinder is held retracted with full system pressure ensuring operation at the desired depth. Cylinder stops are used to restrict the stroke of the center lift cylinder during retraction. This sets the operating depth of the center section relative to the main pull frame 12. The inner wing fold cylinders are permitted to extend or retract responsive to the field profile assumed by the various sections of the toolbar, as will be further described below.

Figure 10:
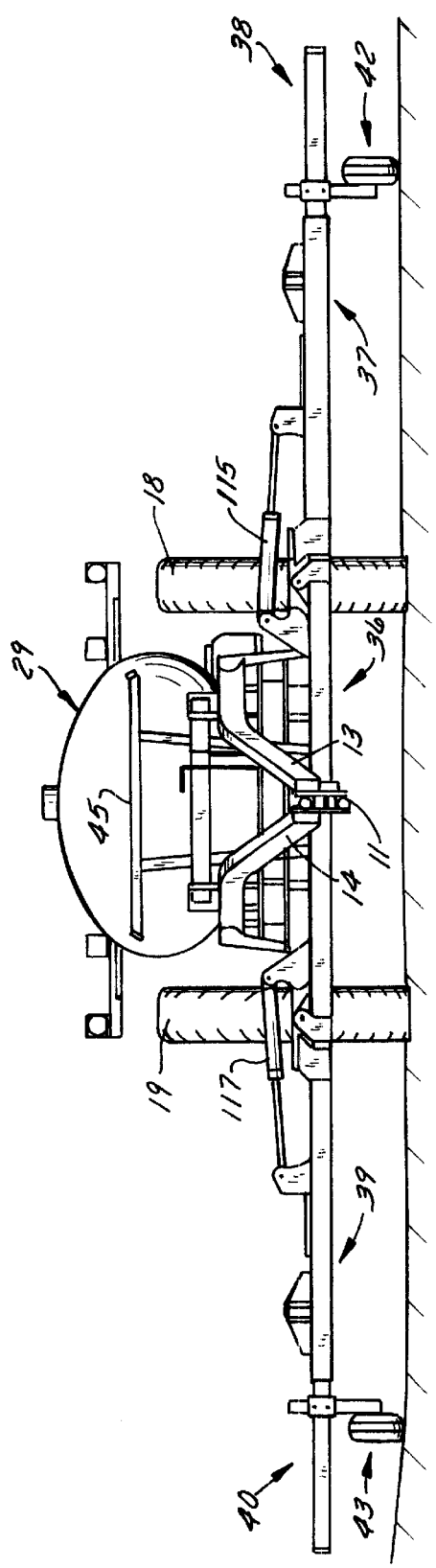
FIG. 10 is a frontal perspective view of the implement of FIG. 1 with the fertilizer applicator tools removed, and with the wing sections in a horizontal position relative to the center section.
Figure 11:
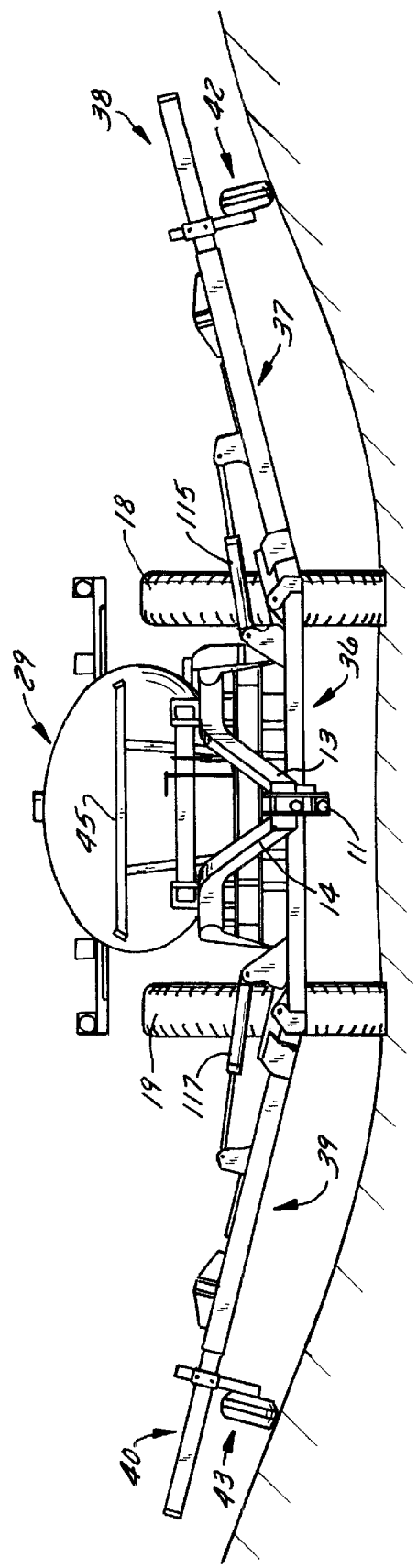
FIG. 11 is a view similar to FIG. 10 with the center section on level ground and both wing sections on elevated ground.

Reference is made to FIGS. 10–13. FIG. 10 shows the toolbar (less tools), respectively, in the Work position with the left wing section and the right wing section both on horizontal ground. In FIG. 11, the left and right wings are elevated above the ground on which the center section rests. In FIG. 12, both wing sections are lower than the center section, and in FIG. 13, the left wing section is elevated and the right wing section is lower than the position of the center section. This flexibility of operation is permitted because the two wings operate independently of one another, as permitted by the hydraulic circuit. As one wing rises relative to the center section, the associated wing fold cylinder is forced to retract. Assuming that the left wing rises, the left inner wing fold cylinder 115 retracts, tending to create a pressure increase in the butt end of the inner wing fold cylinder 115. However, the pressure at port P14 is maintained constant by the pressure reducing/relieving valve C, permitting higher pressure hydraulic fluid to be relieved through valve C, line 160, normally open solenoid valve B and port P2 to the tractor reservoir. Make-up fluid needed to fill the rod end of cylinder 115 passes freely through the bypass check valve of the counterbalance valve F. If either valve B or H is energized by the limit switch 107, return oil may flow through the rod end of the inner wing cylinder associated with the raised wing from the tractor return line via valve C. The right wing operates similar to the left wing as just described, but independently, depending upon whether the right wing is raised, horizontal or lowered (seen at 157 in FIG. 9).

When the ground profile changes so that a wing section lowers, the associated inner wing fold cylinder extends, and this is permitted because of the constant pressure maintained in the butt end via valve C. In the case where a wing is lowered due to a lower ground profile, the net load on the associated wing fold cylinder tends to extend that cylinder. The associated cylinder thus extends, as needed, but again constant hydraulic pressure is applied to that cylinder to provide a substantially constant downward force on the wing even in the lowered position. When this happens, fluid pressure at port P12 (when the left wing cylinder 115 lowers below horizontal) is increased, piloting the associated counterbalance valve F and permitting fluid to flow through valve F and return to the tractor reservoir at a controlled rate which prevents the wing from falling under gravity. Again, the right wing fold cylinder 117 operates in a similar manner with its associated counterbalance valve G, but independently of the left wing.

End Row Cycle

During normal operation in the work position, the work directional valve 146 is left in the work position which is detented, and the wings adjust to variations in the ground contour so that the toolbar as a whole follows the field profile with a substantially constant downward force created by the inner wing fold cylinders. When the operator reaches the end of a row or swath, the operator will want to raise the toolbar in its entirety so that the tools disengage the soil, without folding the toolbar for transport. This is referred to as the end row profile or position which is illustrated in FIG. 19. To effect this profile, the operator removes the work valve from the detented forward position and moves and holds the operating lever so that the work valve 146 is in the reverse position.

With the work valve 146 in the end row turn position, pressurized fluid is applied to port P2 of the manifold 141, and pressurized fluid moves freely through the normally closed ports of valve B, the flow divider/combiner valve D, and through the check valves associated with the counterbalance valves F and G, respectively, to the rod ends of the inner wing cylinders 115, 117. Return flow is established through the ports P13, P14, respectively, from the cylinder ends of the inner wing fold cylinders, line 115, pressure-reducing/relieving valve C (which is piloted by the fluid pressure on line 160), and port P1 to the tractor reservoir. Thus, the inner wing fold cylinders retract in unison controlled by valve D until the wings reach a slight upward inclination above the center section (i.e., the horizontal). At this time, the limit or position switch 107 is closed, thereby actuating the solenoid valves B (and incidentally, valve M. This places valve B in the check valve configuration, thereby prohibiting further flow to the inner wing fold cylinders, and maintaining the wings in the desired, elevated position to complete the end turn. When the limit switch closes, the operator need no longer hold the work directional valve 146 in the reverse position. When valve 146 is centered (closed), the toolbar will maintain its raised position, leaving the operator free to complete the end row turn procedure with the tractor and implement.

The outer wing sections do not rotate during an end row turn procedure, but the center lift cylinder may not have completed its stroke so it is free to extend to raise the center section (and thus the entire toolbar) to the end row profile. It will be noted that at the end of an Unfold cycle, when the wings are lowered to the position of FIG. 16, the wings may be elevated at a slight angle. When the wings are raised from the work position to the end row turn position, the profile of the toolbar is similar to that shown in FIG. 16, but the wings are angled at a slightly less angle. This difference (which is not essential) is caused by the fact that the cam surface 110 activates limit (i.e., position) switch 107 from two different directions in terminating the Unfold and End Row Turn cycles, respectively. This difference has no major significance on the operation of the implement. Both a Fold cycle and a Work cycle may be implemented from either position of the wings, and the operation is otherwise the same for both cycles (i.e., for both wing elevations).

Once poppet valve B is energized by the limit switch 107, and flow through solenoid valve B is inhibited, all remaining flow goes to the butt end of the main lift cylinder 46 via the pilot-operated counterbalance valve A and port P5. The weight of the wings induces an additional pressure on the rod ends of the inner wing fold cylinders. When the center lift cylinder 46 reaches the limit of its extension, the center section is fully raised, disengaging the ground tools so the end row turn can be completed. The height of the center section above the ground in the end turn position is sufficient, according to design, to raise all tools a sufficient amount above horizontal ground level for maneuverability, even in an unlevel field. In an unusually unlevel field, the outer wing fold cylinders may be fully extended (and thus limited) during an end row turn, thereby limiting the downward inclination of the wings.

Fold Cycle

Placing the toolbar in a fully folded or transport position seen in FIGS. 1 and 14 may be accomplished either from the unfold position of FIG. 16 as described above, or, following field operation, from the end row turn position shown in FIG. 19, also described above. Before beginning the Fold cycle, the toolbar is placed in one of these positions, and both operator-controlled directional valves 145, 146 are returned to the center position.

To initiate a Fold cycle from one of the positions described, the operator actuates the transport valve 145 to the forward position shown in FIG. 20. This provides fluid pressure at port P3 of the manifold 141; and fluid flows via line 162 directly to the rod ends of the outer wing cylinders 126, 129 through ports P10 and P9, respectively. The outer wing sections fold along planes generally parallel to their associated inner wing sections. In this case, the outer wing sections are substantially horizontal. This occurs because there is essentially no load (except friction) opposing movement of the wings. The fluid pressure at port P3 is not high enough to enable the counterbalance valves A, F or G. Thus, there is no movement of the main lift cylinder 46 or the inner wing fold cylinders 115, 117 at this time. Poppet valves B and H may or may not be energized, but they have no effect on the folding functions at this time in the cycle.

Once the outer wing fold cylinders are fully retracted, the hydraulic pressure generated by the tractor hydraulic system increases, and fluid flows through check valve E from port P3. This fluid is communicated to the input of the flow divider/combiner valve D, and the fluid then flows freely through the check valves of the counterbalance valves F and G to the rod ends of the inner wing fold cylinders 115, 117, respectively, causing the inner wing fold cylinders to retract. This rotates the inner wing sections upwardly. The hydraulic pressure from the tractor increases as needed to overcome the gravity-induced load on the inner wing fold cylinders. During this phase, a fluid return path is provided through ports P13, P14, line 150, normally open pressure reducing/relieving valve C, line 149, normally-open pilot valve H, and port P4 to the tractor reservoir. Operation continues until the inner wings reach the vertical position shown at 153 in FIG. 9. Once the inner wings go over center toward the transport position, the gravity-induced load on the inner wing cylinders shifts to the butt end of the inner wing fold cylinders. However, there is no change in the valve configuration, and flow continues, causing the inner wing cylinders to continue to retract. The gravity-induced load on the wing cylinders may cause the tractor pressure to decrease because of the reduced load, but the operation continues until the wings are fully folded and rest on the wing support 43. Fluid flows through valve A to extend the center section lift cylinder 46 to raise the center section frame and the wings.

The detent position of the transport valve 145 is not used in the Fold cycle. The positions of the wing sections are stable and secure because valves A, F, G and J are not pilot-operated to open when the hydraulic system is not in use (i.e., the lever of the transport valve is returned to the center closed position.

Having thus disclosed in detail one embodiment of the invention, persons skilled in the art will be able to modify certain of the structure and systems disclosed and to substitute equivalent elements for those described, while continuing to practice the principle of the invention. It is therefore intended that all such modifications and substitutions be covered as they are embraced within the spirit and scope of the claims.

What is claimed is:

1. An agricultural implement comprising:
    a main frame having support wheels and adapted to be drawn by a traction vehicle;
    a toolbar having a center section and at least a first wing section and a second wing section, each wing section mounted to an associated end of said center section for independent movement about a generally horizontal axis;
    a linkage mounting said toolbar to said main frame;
    a first hydraulic unit coupled between said main frame and said linkage for raising and lowering said center section;
    second and third hydraulic units coupled between said center section and said first and second wings respectively for raising and lowering said wing sections;
    a single work valve and a single transport valve adapted to be operated from an operator's position on a traction vehicle; and
    an hydraulic control circuit for controlling said first, second and third hydraulic units, wherein said hydraulic control circuit is responsive to said transport valve being placed in an unfold position when said first and second wing sections are in a transport position to lower said first and second wing sections to an intermediate position;
    said hydraulic circuit being further responsive to said work valve being placed in a work position when said wing sections are in said intermediate position to actuate said first second and third hydraulic units to lower said first and second wing sections from said intermediate position and said center section from a raised position to place the toolbar in a field use position;
    said hydraulic circuit being thereafter responsive to said work valve being placed in an end row turn position to actuate said first, second and third hydraulic units to raise said wing sections above said center section, and to raise said center section above said field use position to permit turning at the end of a row with said toolbar in an elevated position above said field use position and said wings inclined upwardly from their respective connections to said center section; and
    said hydraulic circuit being further responsive to said transport valve being placed in a fold position when said toolbar is in said field use position or said elevated position to actuate said first, second and third hydraulic units to fold said first and second wing sections and raise said center section to a folded position for transport.

2. The apparatus of claim 1 further comprising a plurality of tools mounted in laterally spaced relation on said center section and said first and second wing sections.

3. The apparatus of claim 2 wherein said tools are ground-engaging tools.

4. The apparatus of claim 3 wherein said apparatus is a fertilizer applicator, and further comprising: a storage tank for fertilizer carried by said main frame, said tools being applicators of liquid fertilizer.

5. The apparatus of claim 4 wherein each of said center section, first wing section and second wing section include a forward mounting bar and a rear mounting bar, said tools being mounted alternatively on said forward mounting bar and said rear mounting bar of each of said center, first and second wing sections, the lateral spacing of adjacent tools being substantially constant.

6. The apparatus of claim 5 wherein one of said forward and rear mounting bars of said center section is longer than the other and said forward and rear mounting bars of said wing sections are aligned with and extend substantially adjacent to the associated mounting bar of said center section in said field use position, said apparatus further comprising a hinge mount for connecting each mounting bar of each wing section to its associated mounting bar of said center section, said hinge assembly comprising:

first and second hinge plates mounted to the outboard end of the longer of said mounting bars of said center section and extending upwardly and inwardly thereof to define a first pivot mount, the associated bar of each associated wing section being pivotally connected to said first pivot at a location above the longer mounting bar of said center section and inboard of the outboard end thereof; and third and fourth hinge plates mounted to the inboard end of the longer of said mounting bars of each wing section, said third and fourth mounting plates extending upwardly and inwardly of the inboard end of said longer mounting bar for each wing section, said third and fourth mounting plates defining a second pivot for connection to said associated mounting bar of said center section and characterized in that said first and second pivots for each wing section are axially aligned to define a common hinge, and further characterized in that said forward and rear mounting bars of said center section and said first wing sections are constructed and arranged such that tools may be mounted at substantially any desired lateral location on one of said forward or rear mounting bars of said center section and said first and second wing sections substantially free of interference.

7. The apparatus of claim 3 wherein said first and second wing sections are inner wing sections, said apparatus further comprising:

first and second outer wing sections pivotally mounted respectively to the outboard ends of said first and second inner wing sections for rotation about respective vertical axes; and fourth and fifth hydraulic units actuated by said hydraulic circuit for moving said first and second outer wing sections respectively between said field use position and said folded position for transport.

8. The apparatus of claim 7 further comprising first and second gauge wheels mounted respectively to said left and right outer wing sections for engaging the ground when said toolbar is placed in said field use position for setting the operating depth of ground engaging tools mounted on said toolbar.

9. The apparatus of claim 1 wherein said transport valve further includes an off position, said apparatus further including a position switch responsive to one of said first and second wing sections being moved from said folded position for transport to an intermediate fold position wherein said wings are lowered from said folded position and angled upwardly above said field use position, said hydraulic control circuit further including:

a first solenoid-operated valve (H) operated by said position switch; and a first pressure reducing-relieving valve (C) connected in circuit with said first solenoid-operated valve (H) and said second and third hydraulic units when said transport valve is placed in said unfold position to lower said first and second wing sections, said position switch actuating said first solenoid-operated valve (H) to de-actuate said second and third hydraulic units when said wing sections are moved to said intermediate position.

10. The apparatus of claim 9 wherein said work valve further includes an off position, said work position of said valve being detented, said hydraulic circuit further including:

a first counterbalancing valve (A) connected in circuit with said first hydraulic unit, a second counterbalancing valve (F) connected in circuit with said second hydraulic unit, a third counterbalancing valve (G) connected in circuit with said third hydraulic unit;

a flow divider-combiner valve (D) connected in circuit with said second and third counterbalancing valves (F and G); and a solenoid-operated valve (B) connected in circuit with said flow divider-combiner valve (D) and said second solenoid-operated valve (B), said hydraulic circuit being constructed to actuate said second and third hydraulic units when said work valve is placed in said work position and said wing sections are in said intermediate fold position to further actuate said second and third hydraulic units to lower said first and second wing sections to said field use position; said second solenoid-operated valve (B) having a check valve permitting fluid flow through said pressure reducing/relieving valve (C) to lower said wing sections until said wing sections engage the ground, whereupon said first counterbalancing valve is actuated to actuate said first hydraulic unit to lower said center section to said field use position.

11. The apparatus of claim 10 further comprising:

first and second outer wing sections hinged respectively to said first and second inner wing sections for rotation about respective axes which are vertical in said field use position and inclined relative to the vertical and horizontal in said transport position;

fourth and fifth hydraulic cylinders coupling respective said first and second outer wing sections respectively to said first and second inner wing sections;

said first solenoid-operated valve (H) being actuated by said position switch when said first and second inner wings are placed in said intermediate fold position, said first solenoid-operated valve (H) connected in circuit with said unfold position of said transport valve and said second and third hydraulic units to inhibit further fluid flow to said second and third hydraulic units when said inner wings are placed in said intermediate fold position, said hydraulic circuit further including a piloted sequencer valve (J) connected in circuit with said second and third hydraulic units, said unfold position of said transport valve (145) and said first solenoid-actuated valve (H) such that when said first and second wings are rotated to said intermediate fold position and said transport valve is maintained in said unfold position, pressure increases at said piloted sequence valve (J) to close the same and permit pressurized fluid to actuate said fourth and fifth hydraulic units to open said outer wings to an extended position inclined above horizontal.

12. The apparatus of claim 10 further including a piloted-pressure reducing/relieving valve (C) in circuit with said second and third hydraulic units such that said work control valve may be placed in said detented work position to provide pressurized fluid to said piloted pressure reducing/relieving valve (C) to actuate said second and third hydraulic units to lower said first and second inner wings to said field use position and characterized in that the fluid pressure urging said second and third hydraulic units in operation is substantially constant from said piloted pressure reducing/receiving valve thereby exerting a substantially constant downward force on said wings in said field use position.

13. The apparatus of claim 12 wherein said second and third counterbalancing valves (F, G) are piloted to provide a return flow path for pressurized fluid from said second and third hydraulic units when said work valve is placed in said work position.

14. The apparatus of claim 12 wherein said first counterbalancing valve (A) is piloted to actuate said first hydraulic unit when said wings are in said intermediate position and said work valve is placed in said work position thereby to extend said first hydraulic unit to lower said center section and said first and second wing sections to said field use position.

15. The apparatus of claim 14 including a piloted check valve (E) in circuit with said second and third hydraulic units and piloted to a closed position by said solenoid-operated position switch when said work valve is placed in said work position to provide a fluid return path for said second and third hydraulic units.

16. The apparatus of claim 14 characterized in that when said wing sections are placed in said field use position, said first and second wings hinge independently of each other and under substantially constant downward force.

17. The apparatus of claim 12 wherein when said work valve is placed in said end row turn position said hydraulic circuit actuates said second and third hydraulic units to rotate said first and second wing sections to an elevated position wherein said wing sections are hinged upwardly until said position switch is engaged, whereupon said position switch actuates said second solenoid-operated valve (B) thereby prohibiting further flow of fluid from said second and third hydraulic units and maintaining said wing sections in said elevated position; said second solenoid-operated valve (B) further actuating first hydraulic unit to raise said toolbar from said field use position in said intermediate position.

18. The apparatus of claim 12 wherein said transport valve may be placed in said fold position when said toolbar is in one of said unfold or end row turn positions thereby actuating said fourth and fifth hydraulic units to fold said first and second outer wing sections, said hydraulic circuit increasing fluid pressure when said outer wing sections are folded to actuate said piloted check valve (E) to provide pressurized fluid to actuate said first hydraulic unit to raise said toolbar, said increasing fluid pressure further actuating said second and third hydraulic units thereupon to fold said first and second inner wings for transport.

19. The apparatus of claim 18 further comprising a stop support mounted to said main frame engaging and supporting said first and second inner wing sections in said folded position.

* * * * *